(12) United States Patent
Alvarez et al.

(10) Patent No.: US 11,544,298 B2
(45) Date of Patent: Jan. 3, 2023

(54) SYSTEM AND METHOD OF GEOGRAPHIC DATA AGGREGATION AND ANALYSIS

(71) Applicant: BlastPoint, Inc., Pittsburgh, PA (US)

(72) Inventors: Alison Alvarez, Pittsburgh, PA (US); Tomer Borenstein, Pittsburgh (PA); John Curcio, Pittsburgh, PA (US)

(73) Assignee: BLASTPOINT, INC., Pittsburgh, PA (US)

( * ) Notice: Subject to any disclaimer, the term of this patent is extended or adjusted under 35 U.S.C. 154(b) by 0 days.

(21) Appl. No.: 17/046,972

(22) PCT Filed: May 15, 2019

(86) PCT No.: PCT/US2019/032448
§ 371 (c)(1),
(2) Date: Oct. 12, 2020

(87) PCT Pub. No.: WO2019/222370
PCT Pub. Date: Nov. 21, 2019

(65) Prior Publication Data
US 2021/0149930 A1    May 20, 2021

Related U.S. Application Data

(60) Provisional application No. 62/671,686, filed on May 15, 2018.

(51) Int. Cl.
*G06F 16/29* (2019.01)
*G06F 16/28* (2019.01)
(Continued)

(52) U.S. Cl.
CPC .......... *G06F 16/29* (2019.01); *G06F 16/2462* (2019.01); *G06F 16/285* (2019.01); *G09B 29/007* (2013.01)

(58) Field of Classification Search
CPC .... G06F 16/29; G06F 16/285; G06F 16/2462; G06F 16/909; G09B 29/007
See application file for complete search history.

(56) References Cited

U.S. PATENT DOCUMENTS 9,886,525 B1    2/2018 Soman et al.
9,888,347 B1 *  2/2018 Tan ...................... H04W 4/023
(Continued)

FOREIGN PATENT DOCUMENTS

WO    2019222370 A1    11/2019

OTHER PUBLICATIONS

International Search Report and Written Opinion for International PCT Application No. PCT/US2019/032448, dated Aug. 2, 2019.
(Continued)

*Primary Examiner* — Charles D Adams
(74) *Attorney, Agent, or Firm* — K&L Gates LLP

(57) ABSTRACT

Various systems and methods of aggregating and analyzing geographically indexed data are disclosed. The system can include a server database hosting an application that a client computer may access via a web browser according to a SaaS architecture. The server database can store a variety of geographically indexed data, which may include economic data, demographic data, social data, and various other data types. The server database can be programmed to cause the client to display a map for receiving a selected geographic area defined on the map and then retrieve selected data corresponding to user-selected criteria for the selected geographic area. The server database can then transmit the selected data to the client for display on the map.

26 Claims, 26 Drawing Sheets

(51) Int. Cl.
*G06F 16/2458* (2019.01)
*G09B 29/00* (2006.01)

(56) References Cited

U.S. PATENT DOCUMENTS

| | | | |
|---|---|---|---|
| 2009/0265292 A1* | 10/2009 | Harper | G06N 3/126 706/13 |
| 2011/0113030 A1 | 5/2011 | Hunter et al. | |
| 2011/0137881 A1* | 6/2011 | Cheng | H04W 4/21 707/706 |
| 2013/0046586 A1* | 2/2013 | Lerner | G06Q 10/06 705/7.39 |
| 2013/0159330 A1* | 6/2013 | Smith | G06Q 50/01 707/758 |
| 2013/0262191 A1 | 10/2013 | Nagarajan | |
| 2014/0280064 A1 | 9/2014 | McDougall et al. | |
| 2015/0205838 A1* | 7/2015 | Statchuk | G06F 16/24544 707/714 |
| 2016/0117346 A1* | 4/2016 | Han | G06F 16/29 707/724 |
| 2016/0119748 A1 | 4/2016 | Li et al. | |
| 2016/0321818 A1 | 11/2016 | Shorter et al. | |
| 2016/0337332 A1 | 11/2016 | Ghosh | |
| 2017/0293635 A1 | 10/2017 | Peterson et al. | |

OTHER PUBLICATIONS

International Preliminary Report on Patentability for International PCT Application No. PCT/US2019/032448, dated Mar. 12, 2021.

* cited by examiner

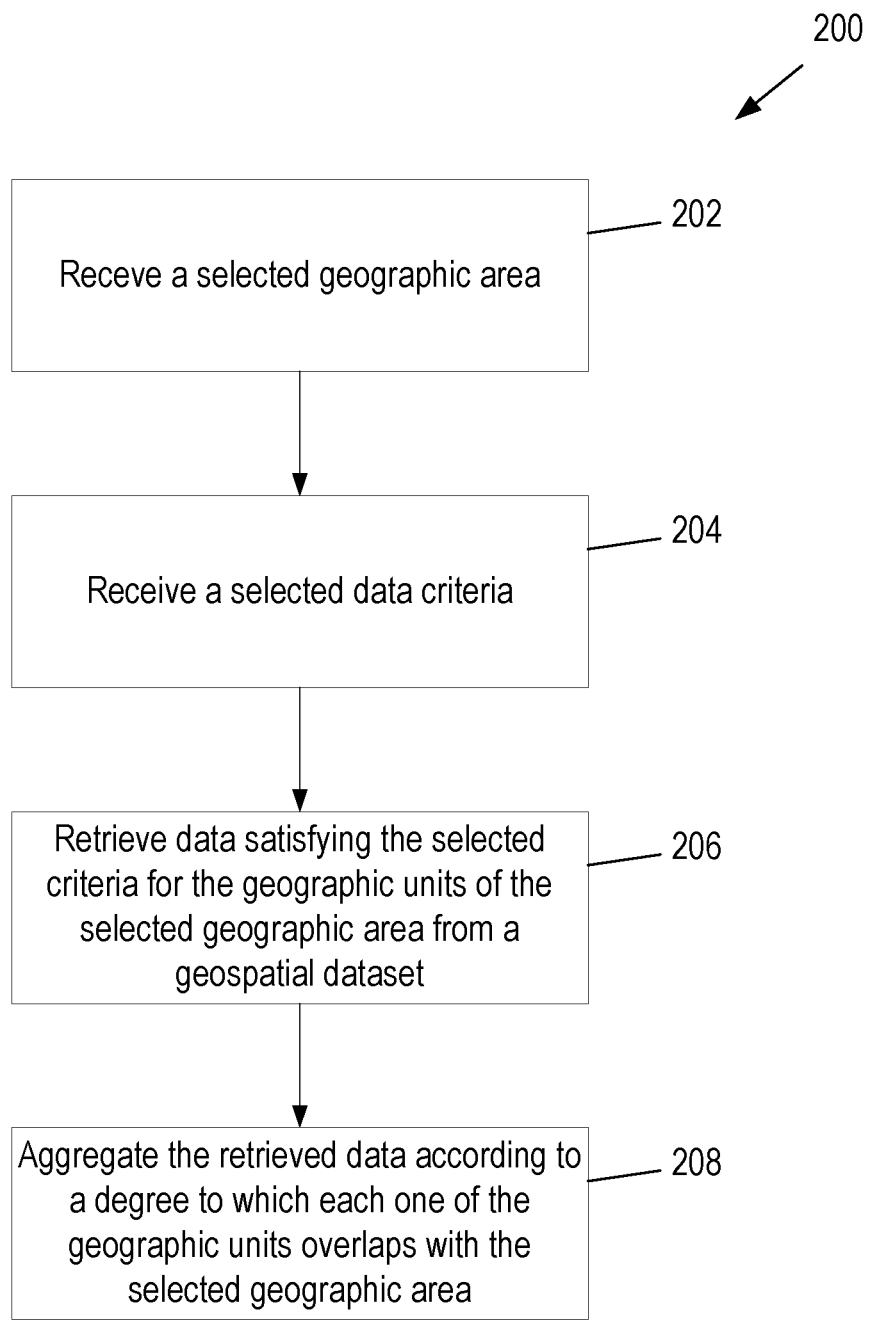

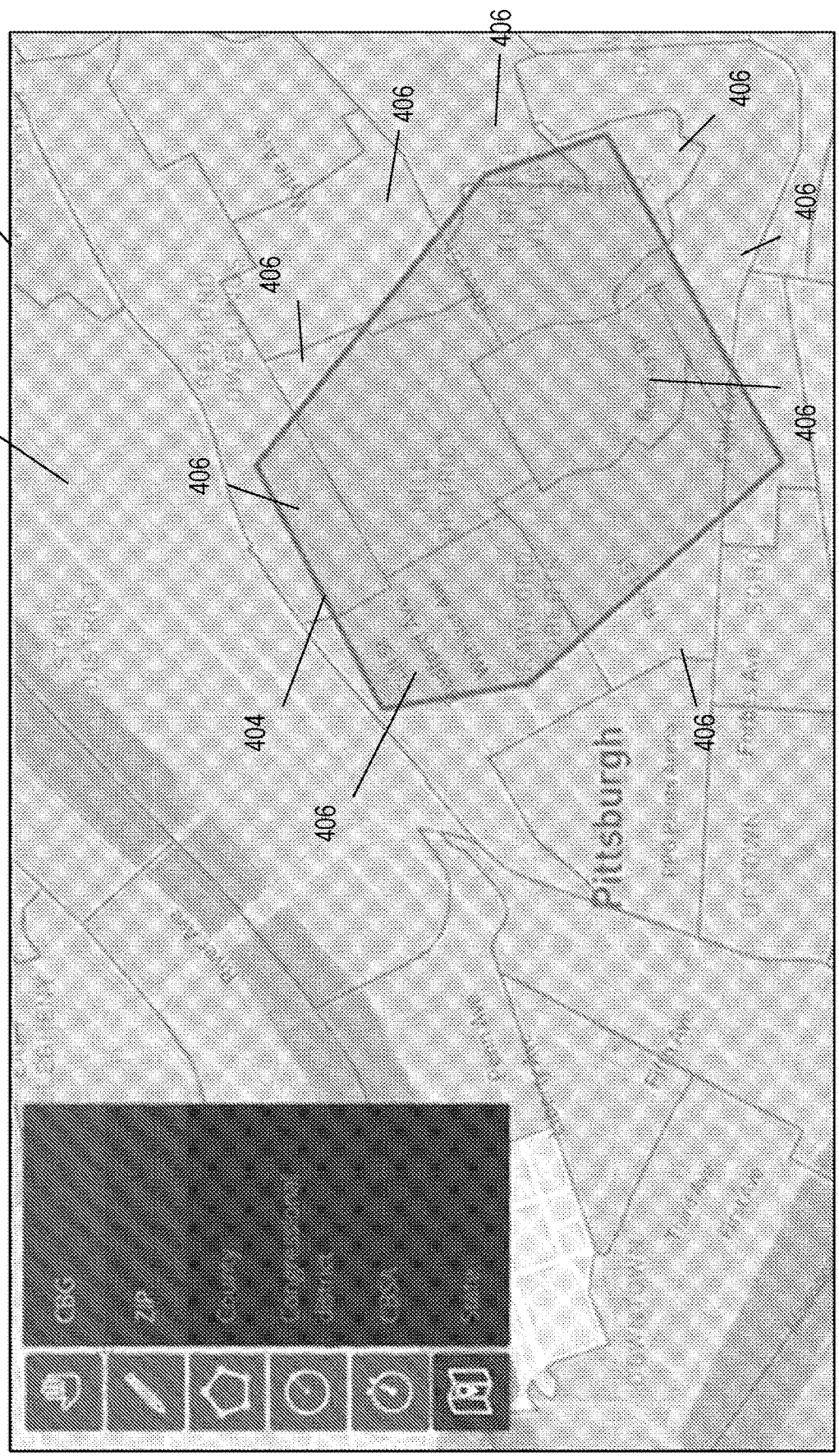

FIG. 5

Add Questions to Report

Search questions

How many used car dealers are in this area?
How many grocery stores are in this area?
How many convenience stores are in this area?
How many drug stores and pharmacies are in this area?
How many doctor's offices are in this area?
How many dentist's offices are in this area?
How many mental health specialists are in this area?
How many beer, wine, and liquor stores are in this area?
How many bars and restaurants are in this area?

You do not have any questions selected. Select one or more to continue.

450
452

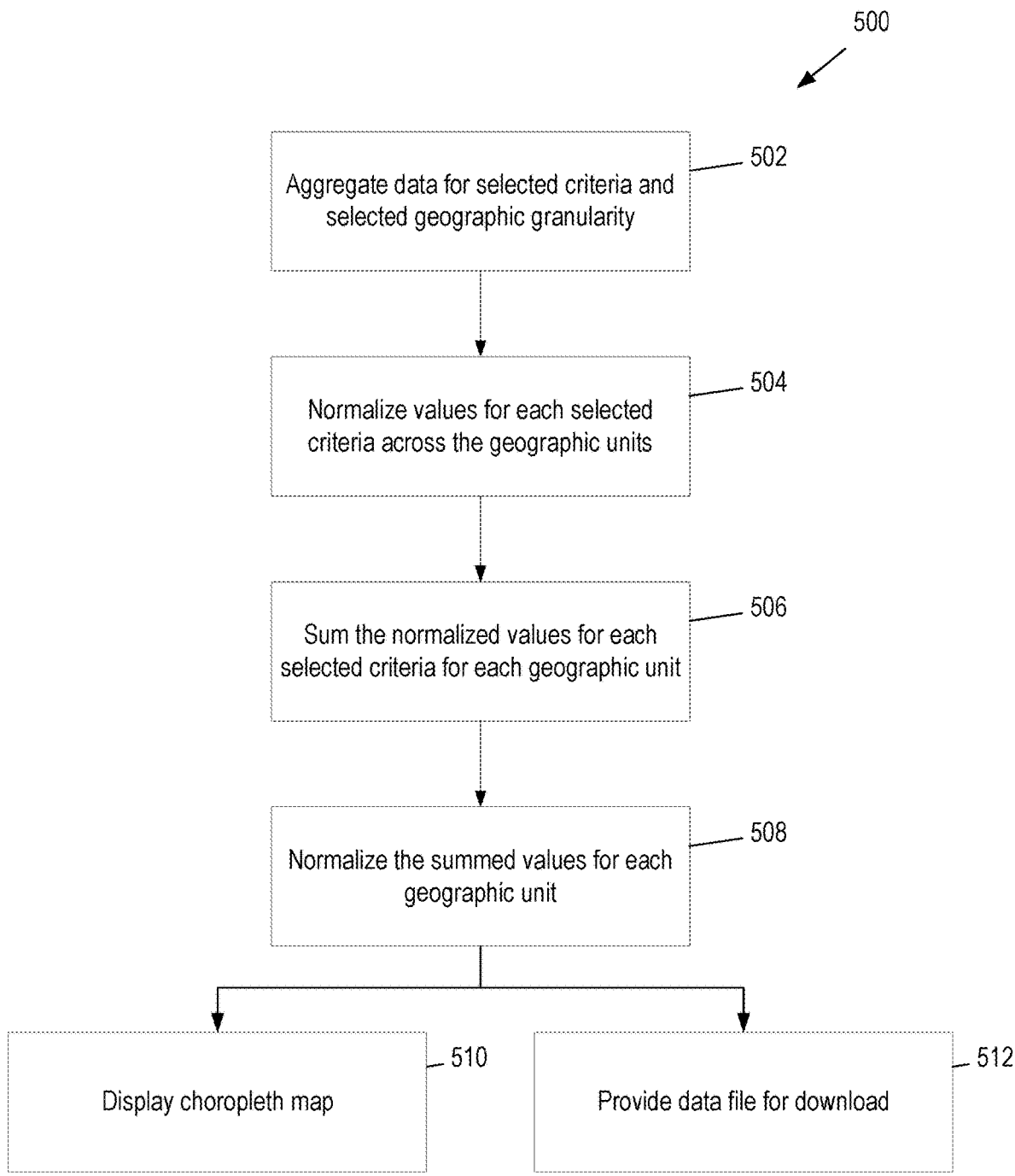

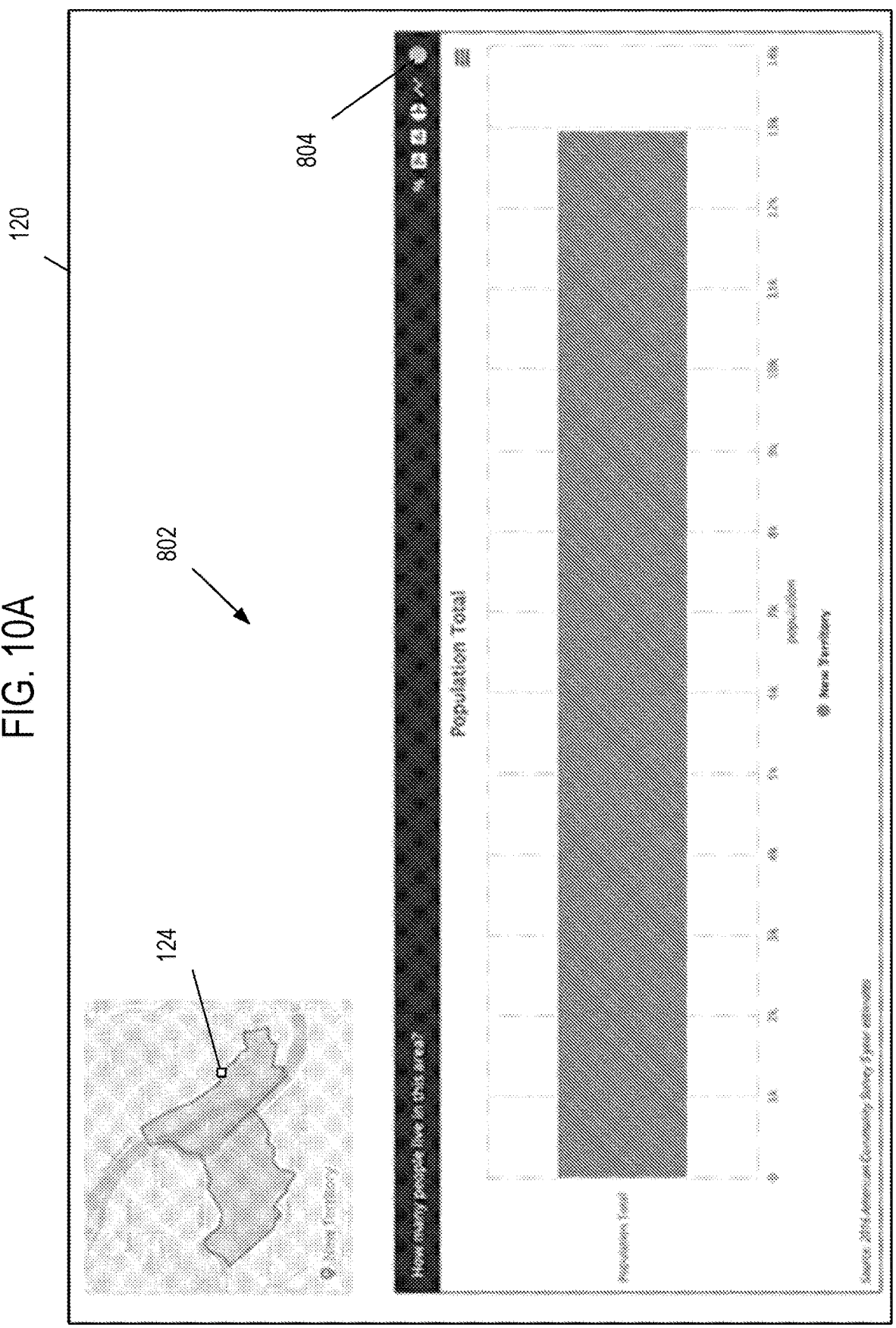

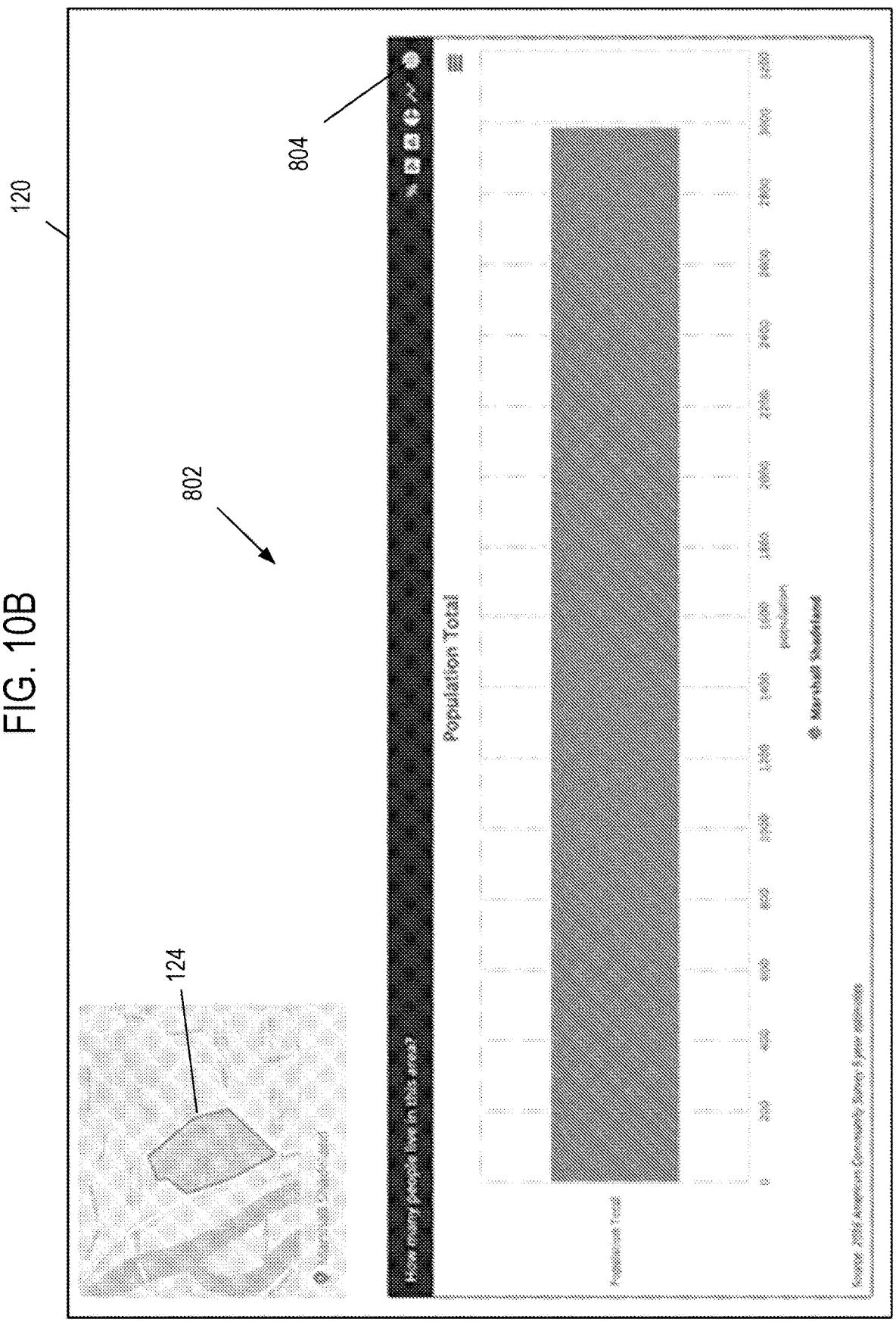

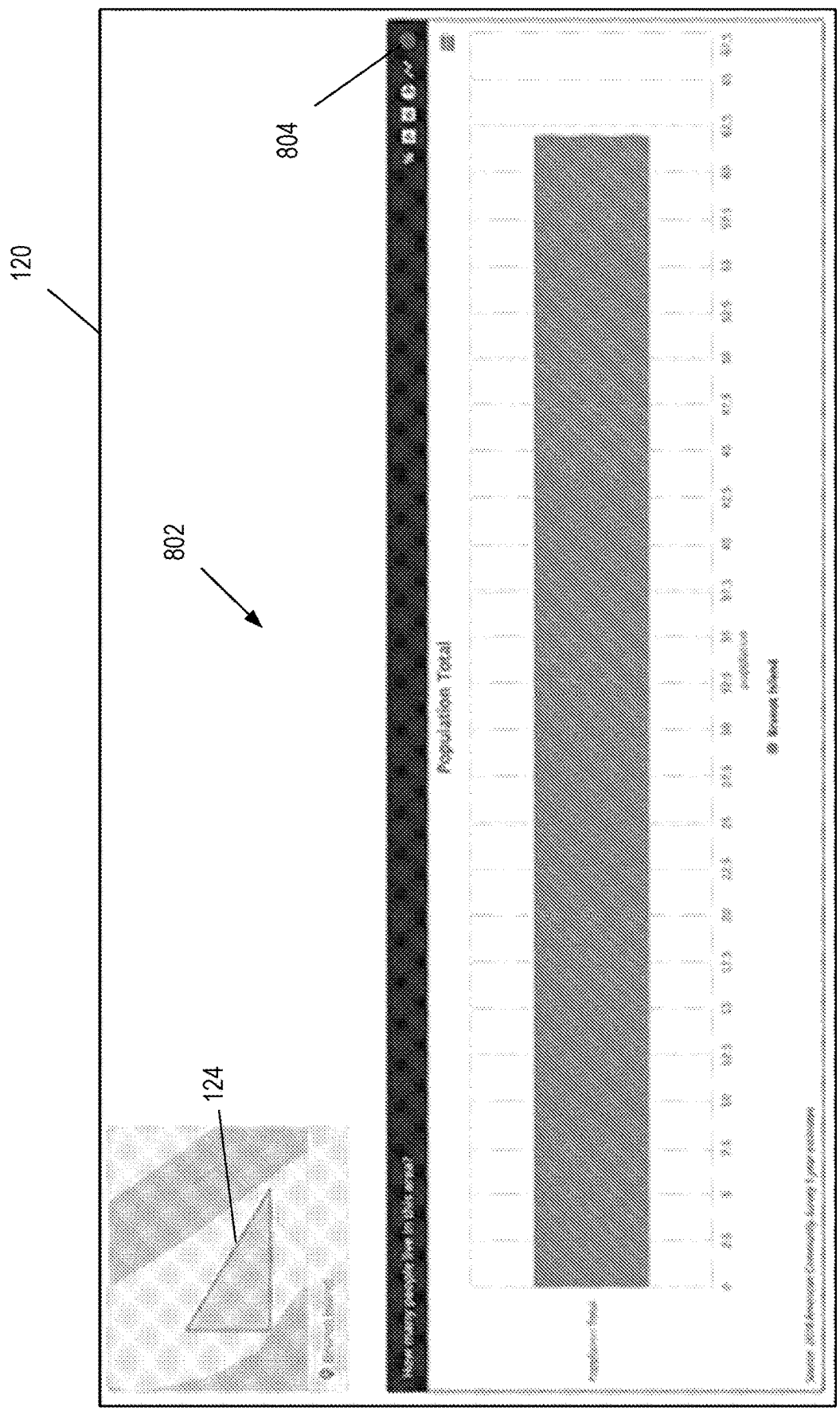

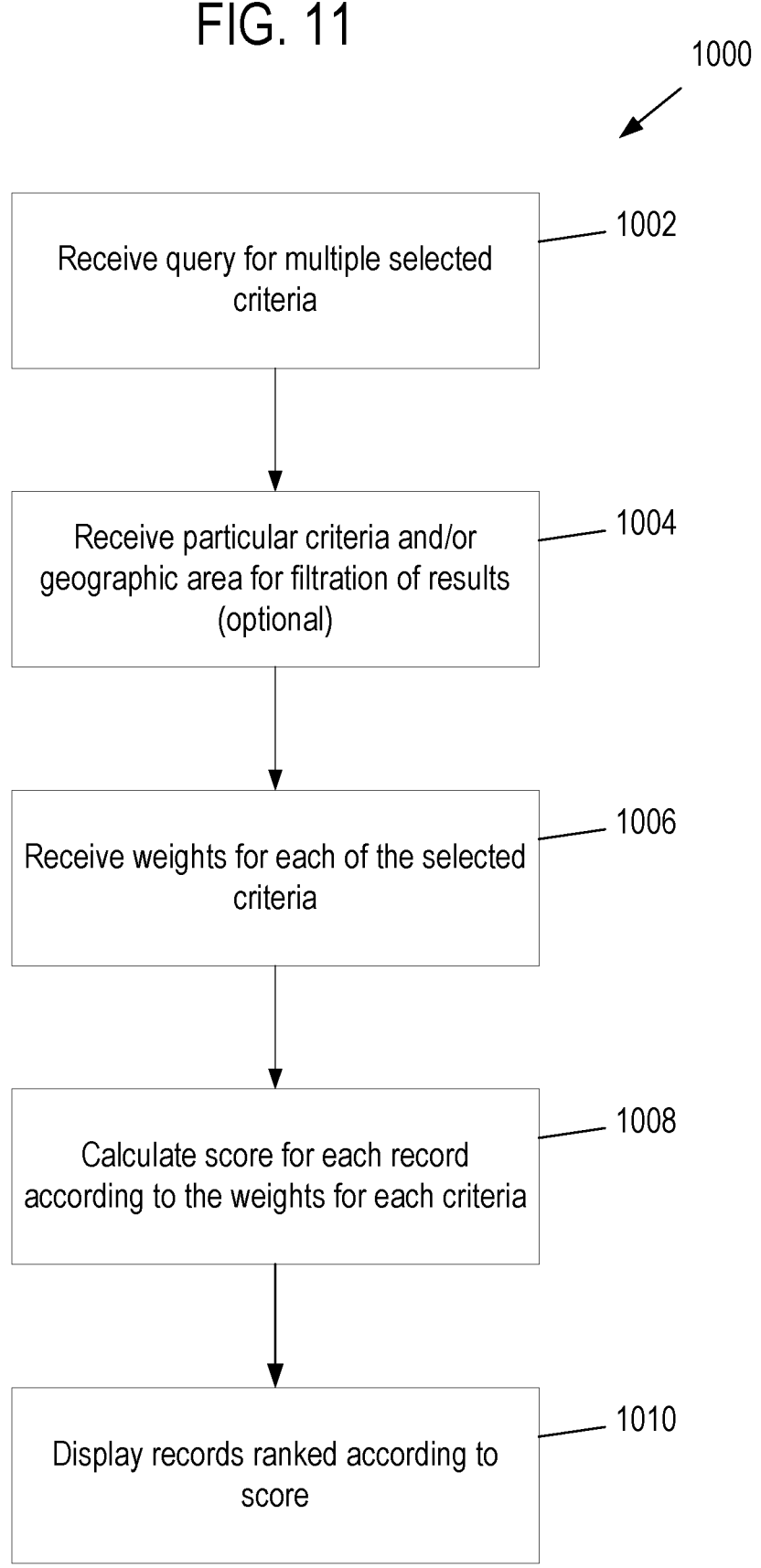

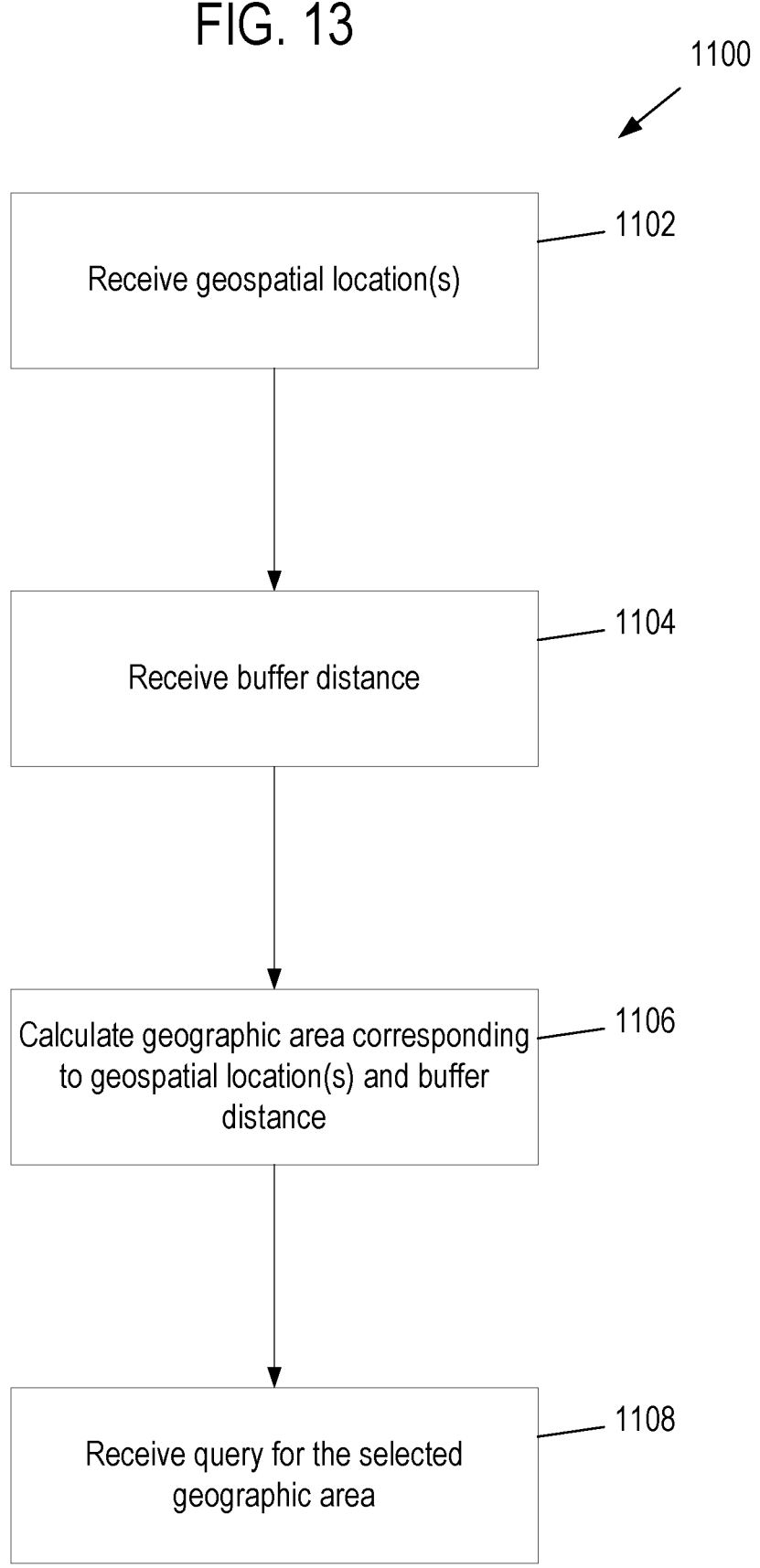

SYSTEM AND METHOD OF GEOGRAPHIC DATA AGGREGATION AND ANALYSIS

PRIORITY

This application is a national stage application under 35 U.S.C. § 371 of PCT Application No. PCT/US2019/032448, filed May 15, 2019, which PCT applications claims priority under 35 U.S.C. § 119(e) to U.S. provisional patent application No. 62/671,686, titled SYSTEM AND METHOD OF GEOGRAPHIC DATA AGGREGATION AND ANALYSIS, filed May 15, 2018, which is hereby incorporated by reference herein in its entirety.

BACKGROUND

Although some economic data, demographic data, and various other data types are available in geographically indexed formats from various data sources, it can be exceedingly challenging to synthesize all of the various data sources and obtain even simple answers to questions that one may have. Further, it can be difficult to obtain highly granular data to assist in making decisions between different potential markets. Therefore, there is a need for analytical tools that provide users with efficient means for answering queries, reports that are easily digestible and visually appealing, which can be utilized in conjunction with the users' own data.

SUMMARY

In one general aspect, the present disclosure is directed to a computer-implemented method for displaying geographic data for a client. For example, the method may include receiving, by a back-end computer system, a selection of a geographic area on a map displayed by the client. The selected geographic area can comprise at least a portion of one or more geographic units. The method may also include receiving, by a back-end computer system, a selected data criteria. The method may also include retrieving, by a back-end computer system, data satisfying the selected data criteria for the one or more geographic units from a geospatial dataset, wherein the geospatial dataset comprises a plurality of data records and each data record of the geospatial dataset includes at least one geospatial attribute and the data are retrieved from the data records based on the geospatial attributes. Finally, the method may include aggregating, by a back-end computer system, the retrieved data corresponding to the selected data criteria according to a degree to which each of the one or more geographic units overlaps with the selected geographic area.

In another general aspect, the present disclosure is directed a computer system comprising a geospatial database and that is programmed to perform the method described above.

Various aspects of the present disclosure can provide several benefits to any individual or business that has need to analyze, aggregate, visualize, or otherwise review data that are linked to a geospatial attribute. For example, the presently described systems provide users with the ability to quickly and efficiently sort through large amounts of geospatial data in a flexible, convenient manner. As another example, the presently described systems allow users to interface proprietary or internal datasets with datasets provided by the back-end computer system to leverage as wide a range of data as possible to assist in making business decisions. As another example, the presently described systems provide answers to complex, geospatially based queries in real-time, without requiring complex database queries or writing code to obtain the desired answers. As yet another example, the presently described systems make the process of constructing queries as simple as intuitive as possible by allowing users to define geographic areas in a wide variety of different ways, making it simple and straightforward to select the databases in which to run queries, and allowing users to toggle between a variety of different output options, including maps and reports for display and/or download.

These and other potential benefits realizable with the present invention will be apparent from the description that follows.

FIGURES

Various embodiments of the present invention are described herein by way of example in conjunction with the following figures.

FIG. 2D illustrates a GUI displaying a geospatial boundary defined by a travel distance from a point on a map, in accordance with at least one aspect of the present disclosure.

FIG. 2F illustrates a GUI displaying a geospatial boundary including multiple differently defined areas on a map, in accordance with at least one aspect of the present disclosure.

FIG. 3 illustrates a logic flow diagram of a process for aggregating data from a geospatial dataset for a selected geographic area, in accordance with at least one aspect of the present disclosure.

FIG. 4 illustrates a GUI displaying a map where a selected geographic area intersects with multiple geographic units, in accordance with at least one aspect of the present disclosure.

FIG. 5 illustrates a GUI displaying selectable data criteria in the form of questions, in accordance with at least one aspect of the present disclosure.

FIG. 6 illustrates a logic flow diagram of a process for scoring aggregated geospatial data for a selected geographic area, in accordance with at least one aspect of the present disclosure.

FIG. 10A illustrates a GUI displaying a report displaying data in which the system has a high degree of certainty, in accordance with at least one aspect of the present disclosure.

FIG. 10B illustrates a GUI displaying a report displaying data in which the system has a moderate degree of certainty, in accordance with at least one aspect of the present disclosure.

FIG. 10C illustrates a GUI displaying a report displaying data in which the system has a low degree of certainty, in accordance with at least one aspect of the present disclosure.

FIG. 11 illustrates a logic flow diagram of a process for scoring and ranking aggregated geospatial data, in accordance with at least one aspect of the present disclosure.

FIG. 13 illustrates a logic flow diagram of a process for filtering data records according to geospatial proximity to a location, in accordance with at least one aspect of the present disclosure.

DESCRIPTION

Figure 1:
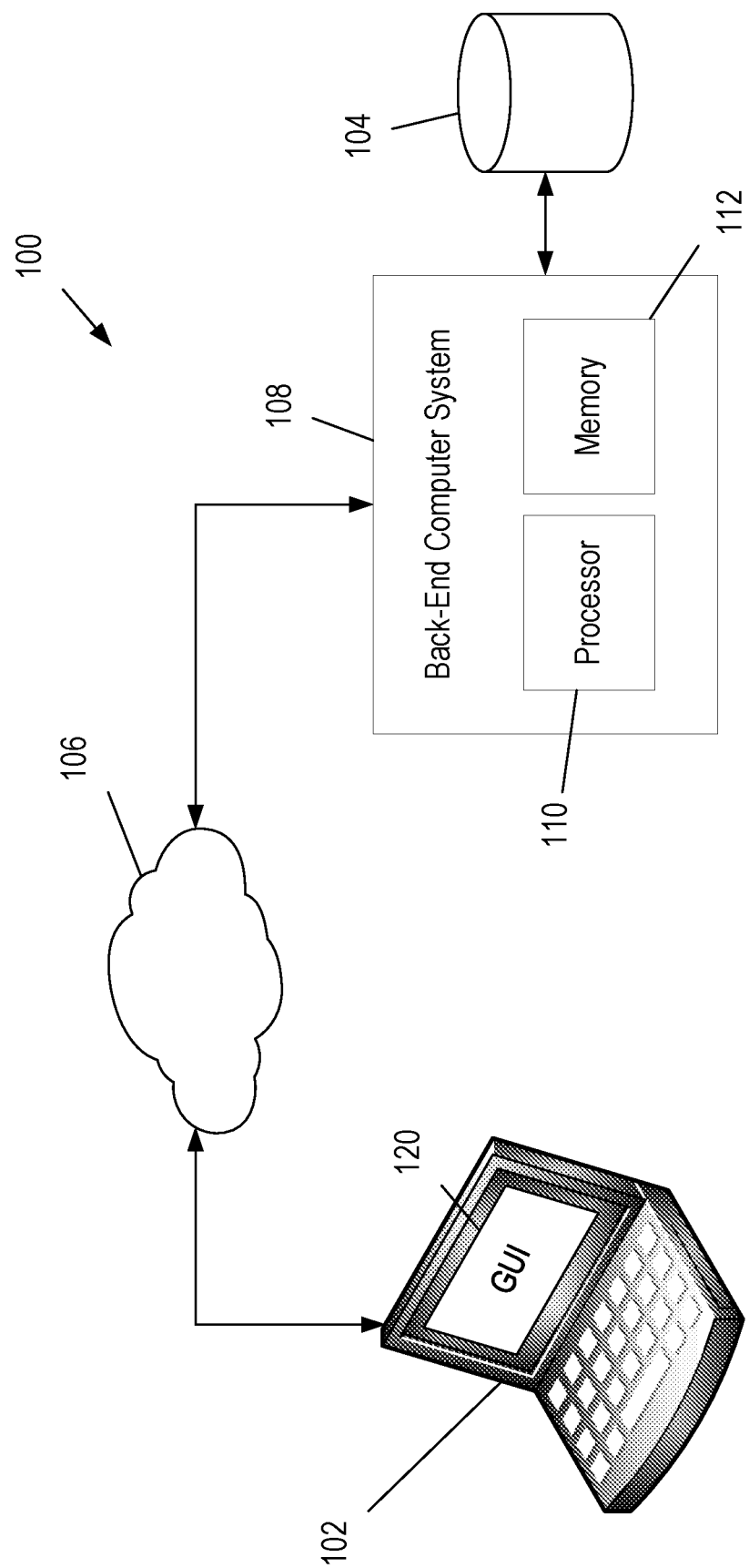
FIG. 1 illustrates a diagram of a system for analyzing geographically aggregated data, in accordance with at least one aspect of the present disclosure.

Certain aspects of the present invention will now be described to provide an overall understanding of the principles of the structure, function, manufacture, and use of the devices and methods disclosed herein. One or more examples of these aspects are illustrated in the accompanying drawings. Those of ordinary skill in the art will understand that the devices and methods specifically described herein and illustrated in the accompanying drawings are non-limiting examples aspects and that the scope of the various aspects is defined solely by the claims. The features illustrated or described in connection with one aspect may be combined with the features of other aspects. Such modifications and variations are intended to be included within the scope of the claims. Furthermore, unless otherwise indicated, the terms and expressions employed herein have been chosen for the purpose of describing the illustrative aspects for the convenience of the reader and are not to limit the scope thereof.

Terminology

The following definitions are provided to assist in understanding the various aspects of the systems and methods described herein.

A "geospatial boundary" is a shape on the Earth's surface consisting of non-crossing series of inner and outer point rings that form the borders of a locational territory and all cutouts (such as lakes or other excluded land). The points in these rings must contain at least two spatial coordinates, but can contain up to n coordinates. These boundaries can contain multiple sets of rings to form non-contiguous figures, for example, representing the Hawaiian Archipelago. The term "shape" can be utilized interchangeably with "geospatial boundary."

A "geospatial attribute" is a point, line segment, or shape existing somewhere in an n-dimensional space (e.g., having a set of (x, y) coordinates for a two-dimensional space).

A "geospatial data" is data containing a series of records that each include at least one geospatial attribute. A geospatial data can be stored in a "geospatial dataset," which can be in the form of, for example, a table with at least two attribute columns, one of which is a geospatial attribute, and at least one row representing a record. A "geospatial database" refers to a database storing a geospatial dataset.

A "Geographical Information System" (GIS) is a system designed to capture, store, manipulate, analyze, manage, and present all types of geographical data.

A "drive-, walk-, or bike-time area" is an area designated by the distance that can be traveled from a given point given a specified means of transportation. Various types of travel times can be calculated according to officially posted speed limits, recommended speeds, expected speeds associated with different road or other travel surface types, historical speed data (e.g., from Google Maps), and combinations thereof.

A "point" is a 0-dimensional figure consisting of a single set of n-dimensional coordinates. In one implementation, a point can refer to a single latitude-longitude geocode on the Earth's surface.

A "line" is a series of connected points forming a line-segment. In one implementation, a line can refer to street segments, pipelines, or other landmarks.

System Architecture

FIG. 1 illustrates a diagram of a GIS 100 for analyzing geographically aggregated data, in accordance with at least one aspect of the present disclosure. The GIS 100 includes a back-end computer system 108 to which a client 102 is communicably connectable via a communication network 106, such as the Internet. In various aspects, the client 102 can be embodied as a laptop computer, a mobile phone, a tablet computer, and other such network-enabled computer devices. The client 102 can include a processor, a memory, a display, and various input devices (e.g., a keyboard and a mouse) and can execute a software application (e.g., a web browser or an app) for sending and receiving data to and from the back-end computer system 108. The back-end computer system 108 can include, for example, a web server and/or another computer system including a processor 110 and a memory 112 to which a client 102 is connectable. The back-end computer system 108 can be programmed to cause the client 102 to display an interface or GUI 120 through which a user at the client 102 can submit queries to or otherwise interact with the back-end computer system 108. Further, the back-end computer system 108 is coupled to and/or includes a database 104 that stores a geospatial dataset that can be retrieved, analyzed by the back-end computer system 108, and transmitted to the client 102 in response to a query. In one aspect, the GIS 100 can be embodied as a Software as a Service (SaaS) model to which the client 102 connects. In one aspect, the back-end computer system 108 and/or database 104 can include or be an aspect of a cloud computing architecture. In one aspect, the database 104 can include static files, relational databases, non-relational databases, physical scannable media, and so on. Further, although the GIS 100 is described as including a single database 104, it should be understood that this is merely for brevity and the GIS 100 can include one or multiple databases 104 (including federated databases) storing geospatial data for access by users via the GIS 100.

The database 104 can store geospatial data (also referred to, in some instances, as "geographically indexed data") from a variety of data sources, such as, for example, the American Community Survey, United States Census (i.e., the decennial census), Economic Census, American Housing Survey, FDIC bank branch information, and any other datasets including a geospatial attribute. The geospatial data can include one or multiple geospatial attributes that associates the geospatial data with one or multiple geographic units. The geographic units to which the geospatial data are indexed can vary in area/size, allowing the geospatial data to be aggregated according to multiple different levels of geographic granularity. For example, a geospatial data record can include a geospatial attribute that indexes the data record to both a first geographic unit and a second geographic unit that is larger in size than the first geographic unit. As the first and second geographic units vary in size, the geospatial data can thus be analyzed at a more granular level (i.e., at the first geographic unit) or less granular level (i.e., at the second geographic unit), depending upon the query constructed by the user. The geospatial data can include, for example, data related to the businesses located in the geographic unit (e.g., the number of doctor's offices, grocery stores, and hotels), demographic data for the inhabitants of the geographic unit (e.g., educational attainment, racial background, and number of households), economic data for the inhabitants of the geographic unit (e.g., workers' incomes, average work commute, how workers commute, number of people having insurance coverage, and types of occupations), housing data for the inhabitants of the geographic unit (e.g., the number of individuals paying rent, average house value, number of vacant housing units, amount of rent paid as a percentage of income, number of vehicles households have available, and type of heating utilized for houses), and social data associated with the geographic unit (e.g., the number of people having disabilities, languages spoken per household, proportion of households receiving SNAP benefits, and ratio of foreign-born to domestically born individuals). The geographic units can include, for example, states, congressional voting districts, core-based statistical areas (CBSAs), counties, zip codes, census block groups (CBGs), city blocks, census tracts, national borders, state borders, provincial borders, department borders, metropolitan or micropolitan borders, dynamic services areas, and any other administrative or non-administrative borders. Because geographic units correspond to different geographic areas and are of different sizes, the geographic units can be represented hierarchically. For example, a state consists of multiple zip codes, which in turn consist of multiple CBGs or portions of CBGs. When desired by users, this hierarchy of geographic units can be utilized to provide greater data granularity by partitioning the selected geographic area by increasingly more granular geographic units.

The geographically indexed data can also include data provided by users or subscribers of the GIS 100, as is described in more detail below under the heading USER-PROVIDED DATA. The users' data can include, for example, data related to a user's business operations (e.g., number and locations of stores, warehouses, and infrastructure) and the user's current or potential customers (e.g., home addresses and number of instances of contact). In one aspect, the data that users upload to the server database 104 are only usable and accessible by them alone. In other words, data provided by the operator of the server database 104 can be made available to all users, whereas data uploaded by users can be partitioned such that the data are only usable by the users that uploaded the particular data. This allows users to perform analyses without exposing proprietary data.

The server database 104 is able to retrieve geographically indexed data for one or more geographic areas defined by the user. Further, the server database 104 can cause the client 102 connected thereto to display the retrieved data, comparisons between different types of data for the defined geographic area, and comparisons between the retrieved data for different defined geographic areas. Aggregating and displaying data in this manner allows users of the GIS 100 to efficiently perform data analyses and receive the results of the analyses in a format that is visually appealing and easily understandable to a user of the client 102.

Area Selection

When a user connects to the back-end computer system 108 via a client 102, the back-end computer system 108 can be programmed to cause the client 102 to display a GUI 120, which can include a map and various controls for providing inputs and/or manipulating the map. The displayed map can include, for example, a road map, topographical map, and/or satellite map. In one aspect, different map types for the displayed map can be selected by the user via the GUI 120. The geographic region displayed by the GUI 120 can selected by the user or automatically selected by the back-end computer system 108. For example, the user could textually identify a geographic area by entering a name or an identifier of the desired area (e.g., state, country, or zip code) or GPS coordinates (e.g., a circle around the entered GPS coordinates) corresponding to the desired area, which could then be retrieved by the back-end computer system 108 and displayed via the GUI 120. As another example, the back-end computer system 108 could be programmed to detect the location of the client 102 and then displaying a geographic region centered on that detected location.

Figure 2A:
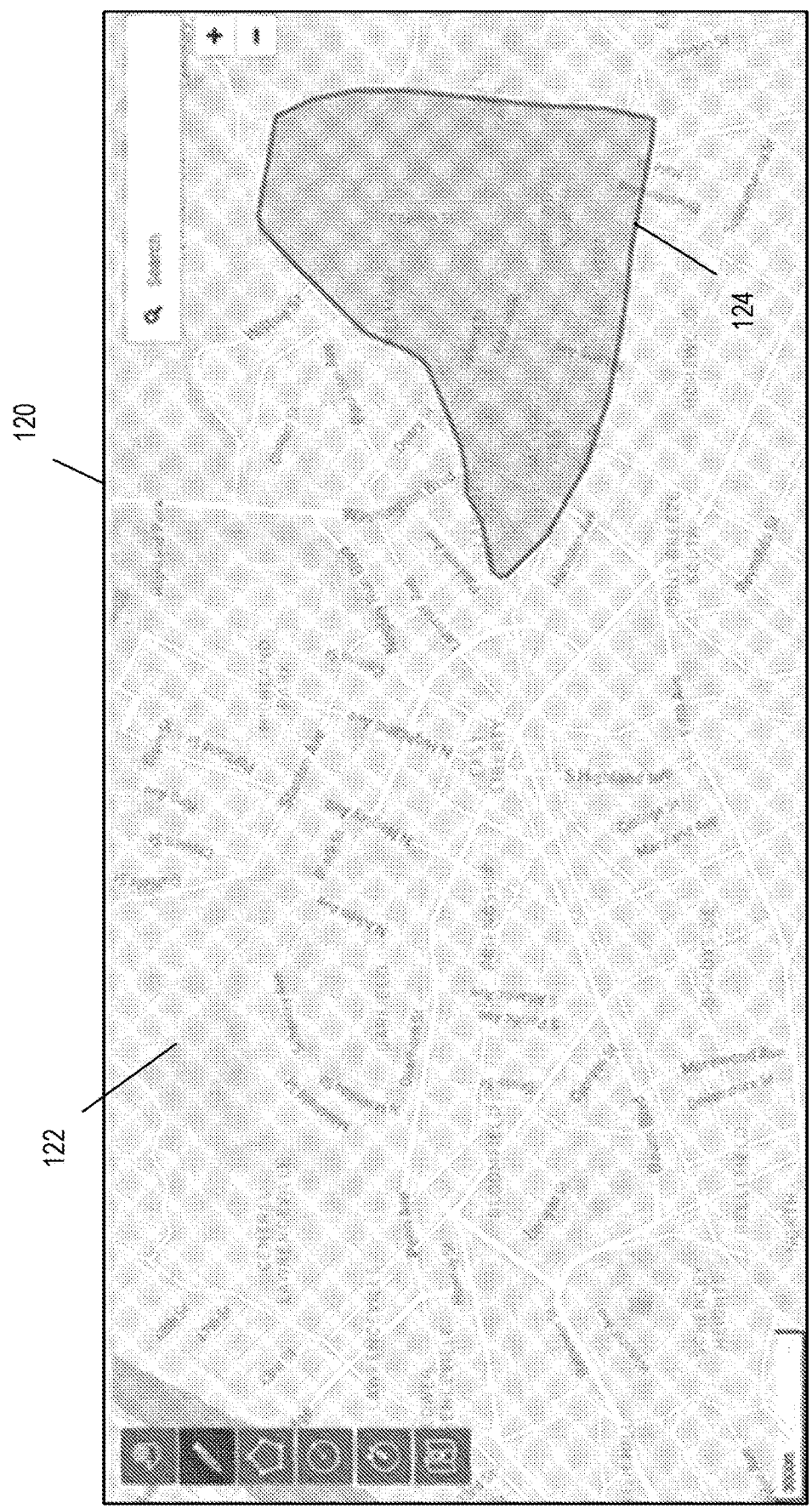
FIG. 2A illustrates a graphical user interface (GUI) displaying a geospatial boundary free drawn on a map, in accordance with at least one aspect of the present disclosure.
Figure 2B:
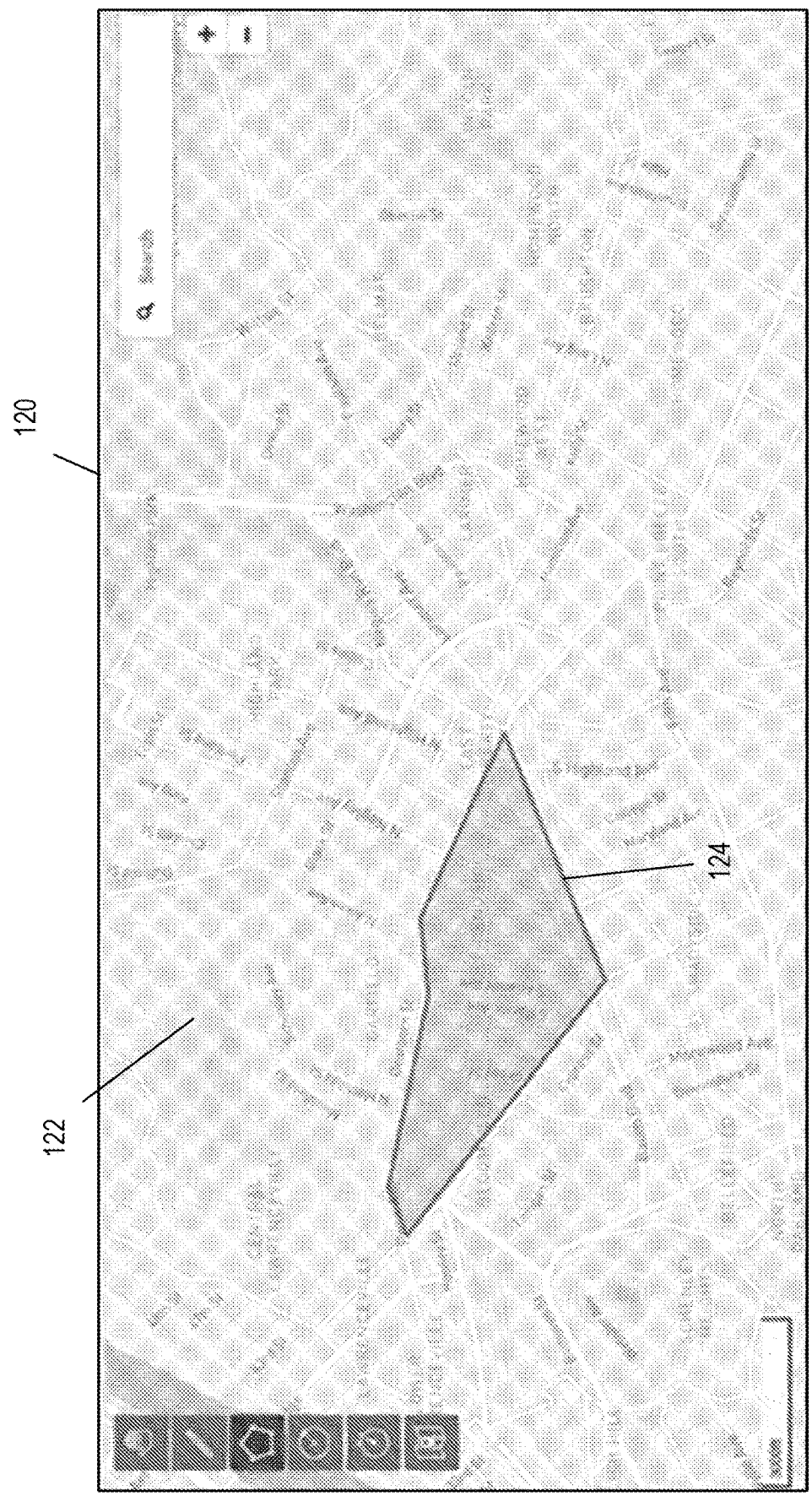
FIG. 2B illustrates a GUI displaying a geospatial boundary delineated by a series of lines defining a polygon on a map, in accordance with at least one aspect of the present disclosure.
Figure 2C:
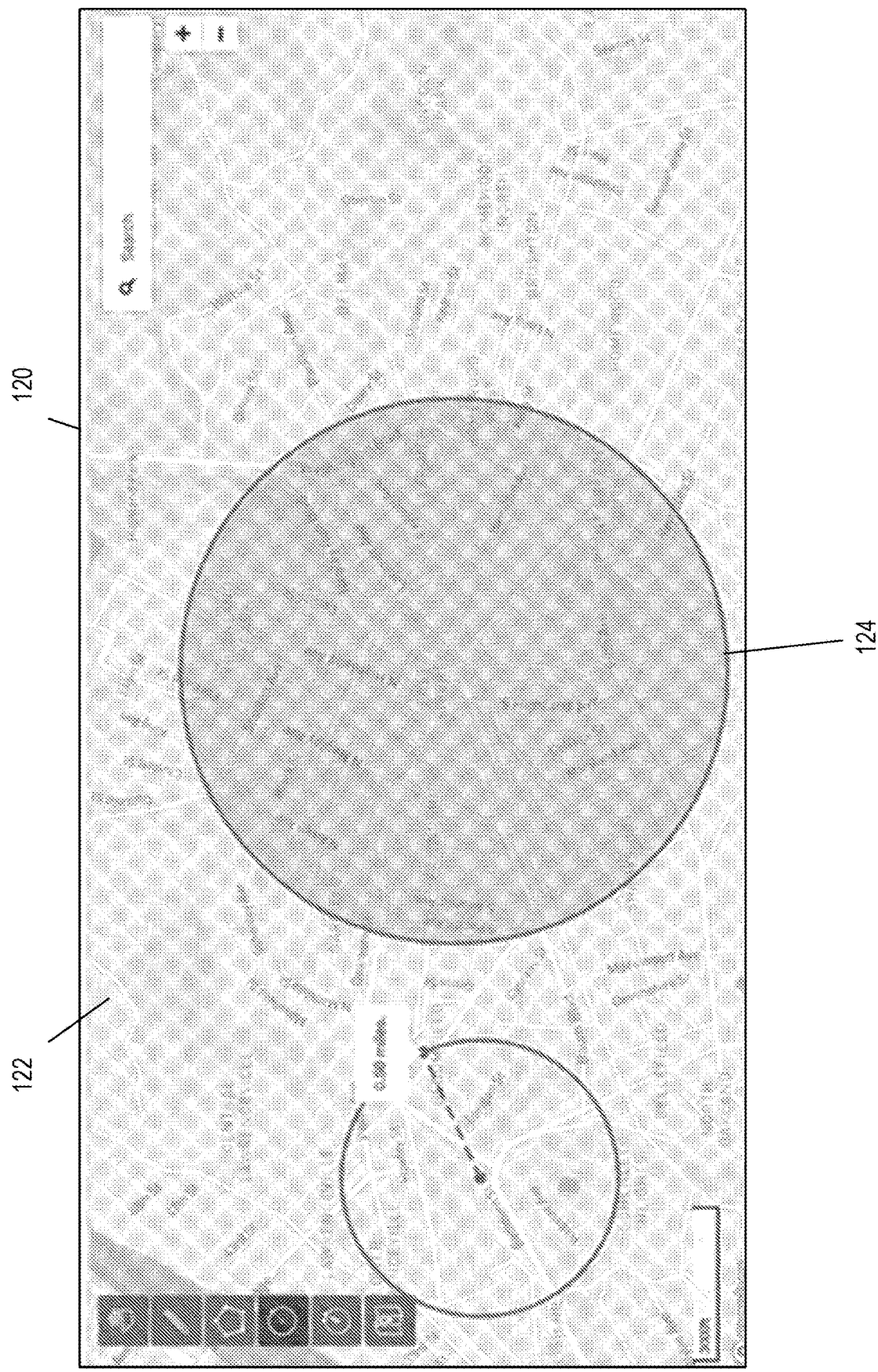
FIG. 2C illustrates a GUI displaying a geospatial boundary defined by a distance from a point on a map, in accordance with at least one aspect of the present disclosure.
Figure 2E:
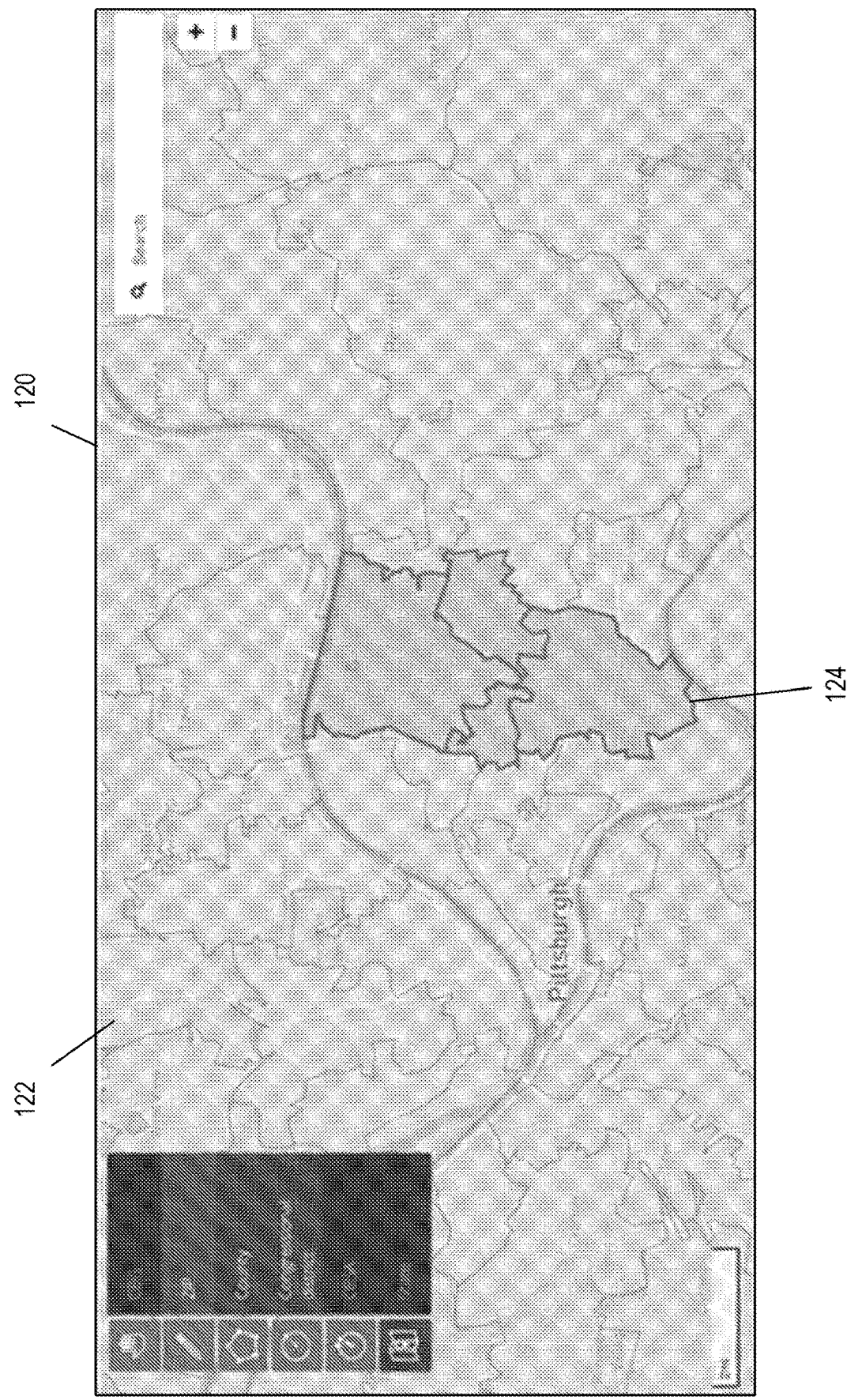
FIG. 2E illustrates a GUI displaying a geospatial boundary defined by a set of zip codes on a map, in accordance with at least one aspect of the present disclosure.

The GUI 120 can be configured to allow the user to select an area on the map for retrieving, aggregating, and/or analyzing geospatial data demarcated by the selected area. The GUI 120 can be programmed to allow users to select a geographic area 124 in a number of different ways, such as via free drawing on the map using a cursor (as shown in FIG. 2A), drawing a polygon from a series of line segments on the map using a cursor (as shown in FIG. 2B), defining the area (e.g., a circle) from a location on the map (as shown in FIG. 2C), defining the area according to a specified criteria (e.g., travel distance from a location on the map, as shown in FIG. 2D), defining the area according to the borders of one or more geographic or administrative units identified by identifiers (e.g., zip codes, as shown in FIG. 2E), or any combination thereof (as shown in FIG. 2F). The selected and/or saved geographic areas can define geospatial boundaries that can delineate the geospatial data that the user wishes to analyze. In one aspect, this selected geographic area can be stored in a database in association with the user account that created the selected area so that stored areas can be later accessed by users. In particular, users can request previously stored areas through the GUI, which then submits a query to a database storing the areas associated with the back-end computer system 108. The back-end computer system 108 then transmits the retrieved area to the GUI 120 for display thereon, after which the user can then run reports and perform various geospatial data analyses utilizing the saved geographic areas, as described below.

Whether a geographic area is selected by defining an area on the displayed map or textually identifying an area, the selected area may intersect one or more underlying geographic units of the map. In other words, the selected geographic area can include geographic units that are wholly within the bounds of the selected geographic area and/or geographic units that are intersected by the bounds of the selected geographic area (and thus only a portion of the particular geographic unit(s) lies within the bounds of the selected geographic area). For example, FIG. 4 illustrates a GUI 120 displaying a map 122 where a selected geographic area 404 intersects with multiple CBGs 406. Further, because different types of geographic units differ in size and arrangement, whether and how the geographic units are intersected by the selected geographic area depends upon the type of geographic unit currently selected by the user.

Data Aggregation for a Selected Geographic Area

The back-end computer system 108 can further be programmed to retrieve and/or analyze data from the database 104 storing a geospatial dataset based on a selected geographic area. The geographic area can be selected via the techniques described above under the heading AREA SELECTION or other techniques. In one aspect, users can select a particular geospatial dataset or combinations of geospatial datasets from a set of geospatial datasets stored in the database 104 on which analyses can be performed. Further, the results output by the back-end computer system 108 can be numerical (e.g., the average age of individuals living within the geographic unit or a normalized score for multiple selected criteria) or categorical (e.g., most common age range of individuals living within the geographic unit).

FIG. 3 shows an illustrative process 200 by which the back-end computer system 108 can aggregate data from the database 104 storing a geospatial dataset. In the following description of the process 200, reference should also be made to FIG. 1. As noted above, the back-end computer system 108 can cause the client 102 to display a GUI 120 including a map representing a geographic region. Accordingly, at step 202, the back-end computer system 108 can receive a geographic area that has been selected via the GUI. In addition to selecting a geographic area for which to run a query, the GUI 120 can be programmed to allow a user to input various criteria for which data are retrieved and/or analyzed by the back-end computer system 108. Accordingly, at step 204, the back-end computer system 108 can receive one or more criteria selected by the user. The criteria can be presented as data item types (e.g., number of pet stores or average household income) or questions 452 (e.g., "How many used car dealers are in this area?") that are selectable by users, as shown by the menu 450 in FIG. 5.

At step 206, the back-end computer system 108 can retrieve the data satisfying the selected criteria for the geographic unit(s) within the selected geographic area from the geospatial dataset stored in the database 104. In one aspect, the user can select the geographic unit type for which the data are retrieved and/or viewed on the GUI.

At step 208, the back-end computer system 108 can aggregate the retrieved data for the selected geographic area according to the degree to which each of the geographic units overlaps with the selected geographic area. In this aspect, the retrieved data can be associated with the geographic unit as a whole, rather than particular locations within the geographic unit. For example, data such as average household income can be associated with the geographic unit as a whole. The back-end computer system 108 can perform this weighted aggregation in a number of different ways. In one aspect, the back-end computer system 108 can perform a direct spatial interpolation of the degree to which each of the geographic units overlaps with the selected geographic area. For geographic units lying entirely within the geospatial boundary defined by the selected geographic area, the back-end computer system 108 can wholly factor (e.g., additively or as a proportional percentage calculation) the data records for those geographic units into the total. For geographic units lying partially within the geospatial boundary, the back-end computer system 108 can partially count the data records for those geographic units by applying a weight based on percentage overlap with the geospatial boundary. This calculation can assume an even distribution across each of the geographic units for the data. For example, if x % of a geographic unit overlaps with the selected geographic unit by area, then a weight of x % can be applied to the retrieved data for the geographic unit. In another aspect, the back-end computer system 108 can perform a hierarchical interpolation of the degree to which each of the geographic units overlaps with the selected geographic area. As in the previously described aspect, data records for geographic units lying entirely within the selected geographic area can be factored wholly into the total. For geographic units lying partially within the geospatial boundary, the back-end computer system 108 can determine whether there is a more granular geographic unit that is located wholly within the overlapping area, retrieve the corresponding data records for that geographic unit, and then wholly factor those data records into the total. For example, if data are being retrieved for a zip code that partially overlaps with the selected geographic area, the back-end computer system 108 can determine whether there is a CBG (or any other geographic unit more granular than a zip code) that lies wholly within the area of the zip code overlapping with the selected geographic area. If there is such a CBG, then the back-end computer system 108 can retrieve the corresponding data for that CBG. For any overlapping portion of the geographic unit for which a more granular geographic unit is not available, the back-end computer system 108 can calculate a spatial interpolation for that geographic unit, as described above, or calculate some other estimate for the data records within this portion. If a more granular geographic unit is also intersected by the selected geographic area, the back-end computer system 108 can perform additional techniques to estimate the data for the selected area, such as area based interpolation or retrieving geographic units having an even finer degree of geographic granularity.

In another implementation of the process 200 illustrated in FIG. 3, the retrieved data can include a geospatial attribute identifying a particular location within a geographic unit and, at step 208, the back-end computer system 108 can aggregate the retrieved data according to whether each particular data item lies within the selected geographic area. For example, data such as the number individuals in each household can be associated with a particular address. Accordingly, the back-end computer system 108 can determine whether each household data item is within the selected geographic unit on an address-by-address basis.

The back-end computer system 108 can be programmed to provide the aggregated data to the client 102 or otherwise cause the GUI 120 to display the aggregated data. In various aspects, the aggregated data can be provided to the user in the form of reports or on the map displayed by the GUI 120. The aggregated data can be graphically displayed in a report in the form of, for example, a histogram, a line graph, and/or a pie chart for each of the selected geographic areas for comparison therebetween. The aggregated data can also be displayed on the map itself in the form of, for example, a choropleth map. Choropleth maps can also take a number for different forms. For example, a choropleth map can display a score calculated for each of the geographic units according to one or more selected criteria (which is described in greater detail below under the heading DATA SCORING ACCORDING TO SELECTED CRITERIA), as in FIG. 8A. Alternatively, a choropleth map can display categorical information for a selected criterion, as in FIG. 8B (which is displaying a choropleth map indicating the most common age range for each of the geographic units within the selected geographic area).

Data Scoring According to Selected Criteria

It can also be desirable to compare or rank geographic territories within a selected geographic area based on the data that is retrieved or aggregated by the criteria selected by the user. However, different types of data can be count-based, rate-based, or otherwise difficult to compare. Therefore, different types of data need to be transformed into comparable formats before they can be analyzed in tandem with each other. Accordingly, the back-end computer system 108 can further be programmed to calculate normalized scores for geographic territories based upon the criteria selected by users in order to rank or compare the geographic units within a selected geographic area. The scores can be calculated based upon one or multiple variables or criteria selected by the users. Further, the calculated scores can be displayed on the client 102 in the form of a choropleth or heat map, provided for download, and so on. In one aspect, the back-end computer system can be programmed to allow the user to select whether the normalized scores are calculated for raw counts of the data (e.g., number of individuals aged 18-35 living in each geographic unit) or rates of the data (e.g., percentage of individuals aged 18-35 living in each geographic unit).

Figure 7:
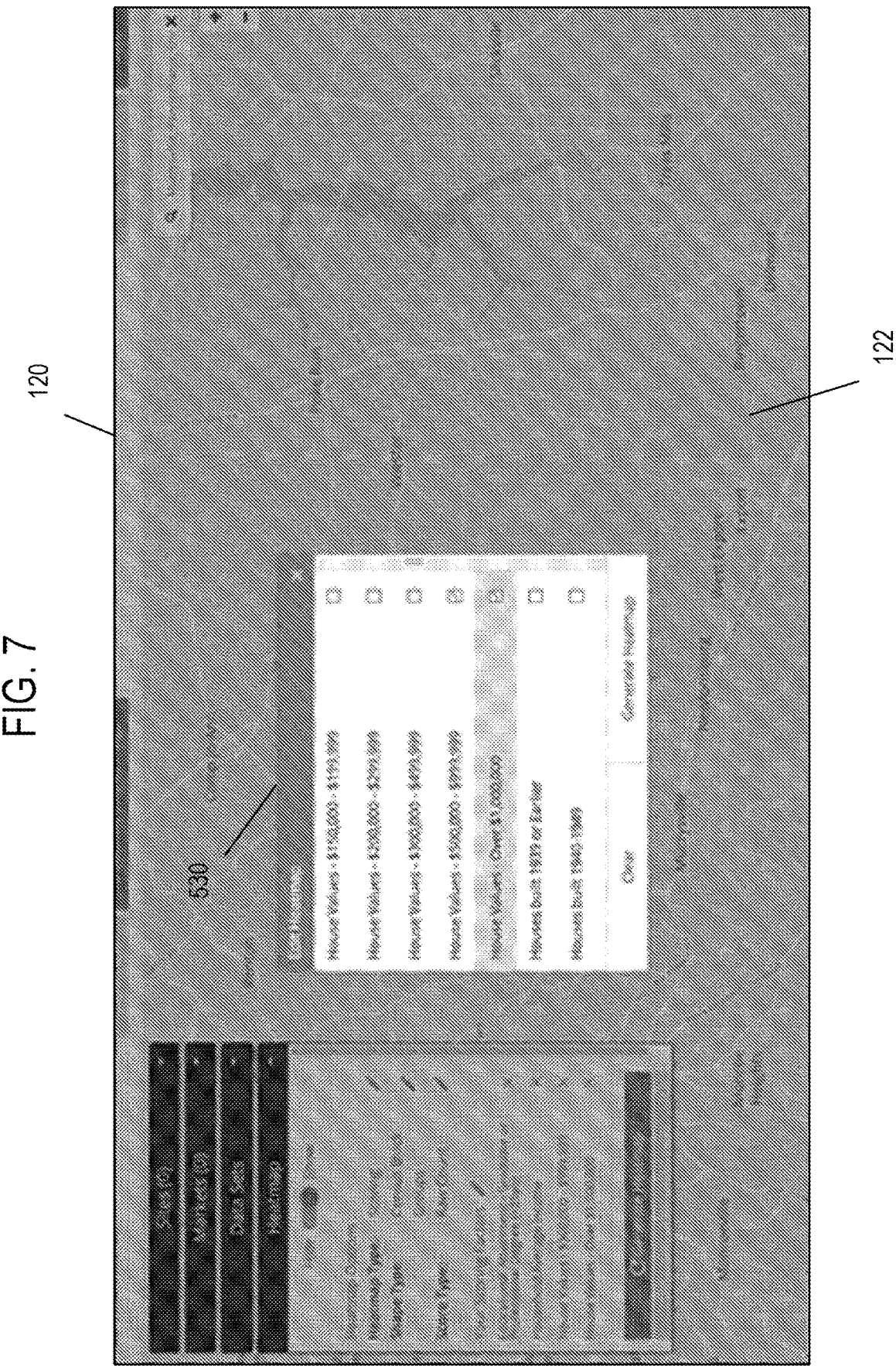
FIG. 7 illustrates a GUI for selecting one or multiple criteria to be displayed on the map and/or scored, in accordance with at least one aspect of the present disclosure.

FIG. 6 shows an illustrative process 500 by which the back-end computer system 108 can calculate scores for aggregated geospatial data. In the following description of the process 500, reference should also be made to FIG. 1. Accordingly, at step 502, the back-end computer system 108 aggregates the geospatial data for the selected criteria and a geographic granularity selected by the user. The geographic granularity specifies the particular type of geographic units for which the geospatial data are aggregated. In one aspect, step 502 can be embodied by the process 200 described above under the heading GEOGRAPHIC AREA DATA AGGREGATION. The user can select the criteria to be scored via the GUI 120, such as shown in the example of FIG. 7. The GUI 120 can include, for example, a selection menu 530 for selecting one or multiple criteria to be displayed on the map 122 and/or scored. In the example shown in FIG. 7, the user has selected four criteria for scoring: (i) individuals having a graduate or professional degree, (ii) household average income, (iii) house values between $500,000 and $999,999, and (iv) house values $1,000,000 and over. Further, in this example, the user has selected the geographic units utilized as the basis for the scoring (i.e., the geographic granularity) as CBGs. Still further, in this example, the user has selected raw count data to be utilized as the basis for the scoring.

At step 504, the back-end computer system 108 normalizes the values for each selected criteria across the geographic units with the selected geographic area. The back-end computer system 108 can normalize the values for the selected criteria by, for example, calculating a ratio between each of the values for the particular selected criteria and the highest value for the particular selected criteria and then scaling the ratios to a predetermined value (e.g., 100). If the user has selected multiple criteria, then the values are normalized for each particular criteria type to the same scale so that the different selected criteria types can be compared together.

At step 506, the back-end computer system 108 sums the normalized values for each selected criteria for each geographic unit. At step 508, the back-end computer system 108 normalizes the summed values for each geographic unit to generate a normalized total score for all of the selected criteria across all of the geographic units within the selected geographic area. If only a single criteria has been selected by the user, then step 506 and step 508 can be skipped by the process 500. In one aspect, the back-end computer system 108 can further be programmed to receive (e.g., from the user) a relative weight that can be applied to each of the selected criteria types. The relative weight can be applied to each of the selective criteria types when summing them at step 508 to allow the user to selectively control the amount or degree that each selected criteria contributes to the normalized total value for the selected criteria. As a default, the normalized variables may be weighted equally.

Figure 8A:
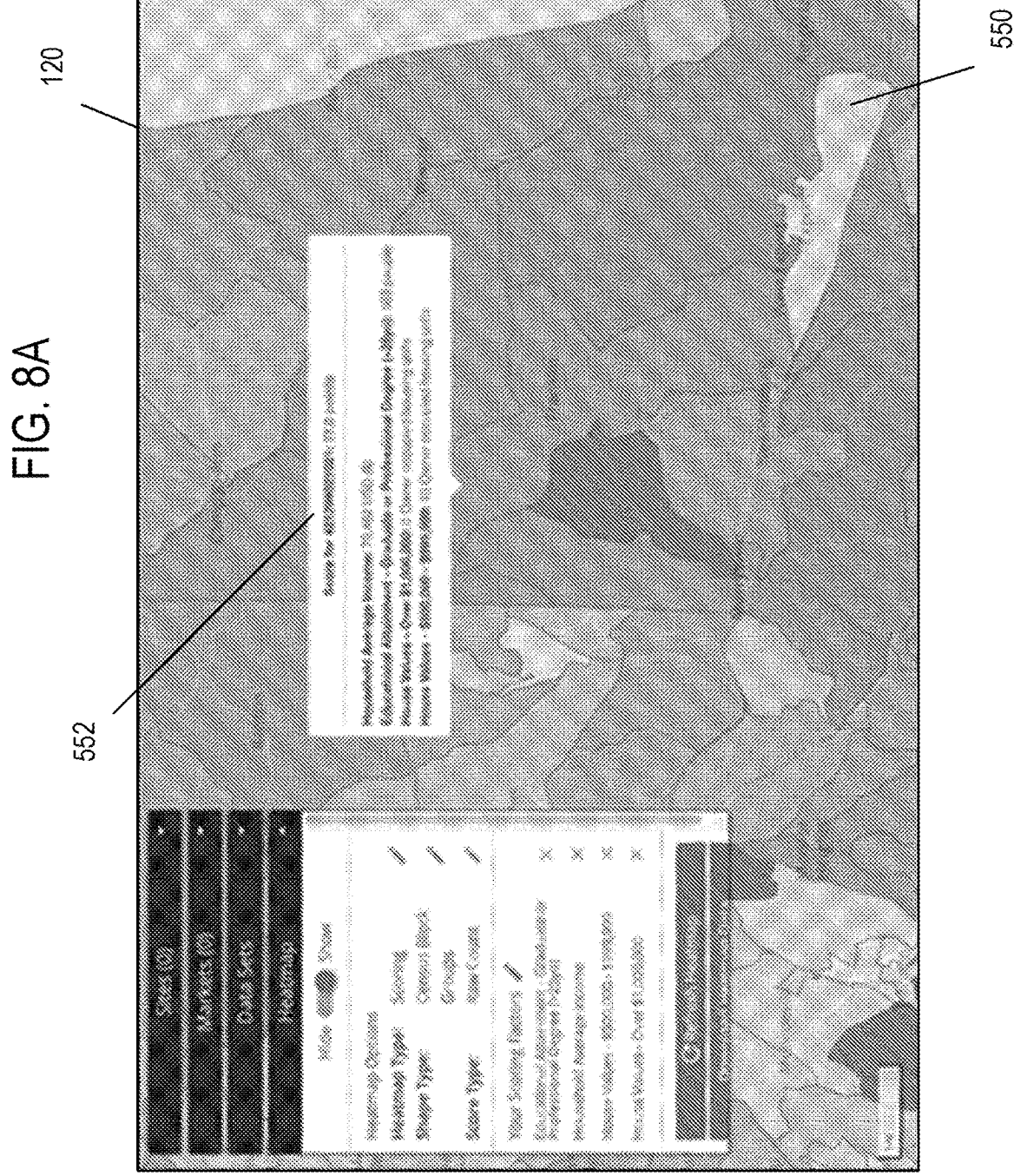
FIG. 8A illustrates a GUI displaying a multivariate choropleth map for a selected geographic area, in accordance with at least one aspect of the present disclosure.

Once normalized values for the selected criteria have been calculate, the back-end computer system 108 can take a variety of different actions to display and/or provide the calculated data to users. In one aspect, at step 510, the back-end computer system 108 can display a choropleth map 550, as shown in FIG. 8A. In another aspect, at step 512, the back-end computer system 108 can provide a data file of the normalized data for download by or to the client 102.

The user can specify how the back-end computer system 108 displays and/or provides the output of the analysis. For example, the output can be provided in the form of a choropleth map 550. In the choropleth map 550 generated at step 510, the geographic units can be designated with different color intensities, hues, or other indicia to illustrate the relative values of the normalized scores calculated by the back-end computer system 108. As noted above, the choropleth maps 550 generated by the process can be univariate (i.e., based on a single criteria selected by the user) or multivariate (i.e., based on multiple selected criteria). The color of a geographic unit within a selected geographic area of the choropleth map 550 can correspond, for example, to the percentile of the geographic unit relative to the other geographic units within the selected geographic area for the selected data (based upon either a count or rate basis). In one aspect, the GUI 120 can be programmed to display a tooltip 552 for each of the geographic units within the selected geographic area to display the underlying data for the choropleth map 550, as shown in FIG. 8A. In sum, the described scoring process 500 allows different geographical areas to be compared using a single metric encompassing multiple different variables (i.e., criteria).

In one aspect, the back-end computer system 108 can further be programmed to determine whether there is sufficient data for a selected criteria in a particular geographic unit. If a geographic unit is missing data or has less than a threshold amount of data for a selected criteria, then the back-end computer system 108 can be programmed to designate the geographic unit with a particular indicia (e.g., greying the geographic unit out) to indicate that a score has not been generated for that geographic unit.

Data Certainty Estimation

Some aspects described herein utilize various techniques for estimating data that is being aggregated and/or analyzed. The certainty or reliability of such data estimations can vary greatly based on the underlying data sample and other factors. For example, when using the spatial interpolation and other estimation techniques described above under the heading GEOGRAPHIC AREA DATA AGGREGATION, the data estimations for geographic areas that are smaller and/or have more complex boundaries may tend to be less certain than estimations for geographic areas that are larger and/or have less complex boundaries. Estimations for larger areas will tend to be more certain because the sample sizes for the selected criteria will be larger and thus less susceptible to variance from estimation techniques. Further, estimations for areas with relatively less complex boundaries will tend to be more certain because they may require fewer distinct portions to be combined together into a single estimate, may intersect with fewer geographic units (and thus require fewer estimation calculations to be performed), and/or may avoid potentially complex interactions between the borders of the geographic area and the population distribution within the geographic area. Accordingly, in one aspect, the back-end computer system 108 can be programmed to indicate the degree of certainty in the data provided by the back-end computer system 108 in response to a query. For example, the back-end computer system 108 can be programmed to calculate a data certainty metric and then visually and/or numerically communicate the calculated data certainty to the user.

In one aspect, the back-end computer system 108 can be programmed to communicate the reliability of the queried data via an indicator 804 displayed on the GUI 120, as shown in FIGS. 10A-10C, for example. In these examples, the data certainty indicator 804 is displayed in connection with a report 802 in the form of a line graph depicting the amount people pay in rent for three different cities. However, the data certainty indicator 804 can be displayed in connection with a map or various other aspects of the GUI. The indicator 804 can be displayed in a variety of different states depending on the certainty metric calculated by the back-end computer system 108 to communicate varying degrees of certainty in the information provided by the back-end computer system 108. In one aspect, the data certainty indicator 804 can indicate whether the data are reliable, potentially unreliable, or unreliable. The data certainty indicator 804 can, for example, be displayed in a particular color according to the calculated certainty metric. For example, in FIG. 10A the indicator 804 can be in a first state (e.g., colored green) to indicate that the reported data are certain (i.e., highly reliable) for the selected criteria (total population). The reported data are reliable in this example because the selected geographic area 124 covers two zip codes and thus its sample size is high for the selected criteria. The high sample size is sufficient for making high reliable calculations. As another example, in FIG. 10B the indicator 804 can be in a second state (e.g., colored yellow) to indicate that the reported data are potentially uncertain (i.e., moderately unreliable) for the selected criteria. The indicator 804 being in the second state indicates that the returned data are potentially unreliable based upon the size of the selected geographic area 124 and the data error rate for the selected criteria. Therefore, users should proceed with caution when utilizing the returned data. As yet another example, in FIG. 10O the indicator 804 can be in a third state (e.g., colored red) to indicate that the reported data are uncertain (i.e., unreliable) for the selected criteria. The reported data are unreliable in this example because the selected geographic area 124 only covers Brunot Island, which has a low or nonexistent permanent population and thus its sample size is low (or zero) for the selected criteria. The low sample size is insufficient for calculating estimates for the selected criteria at the CBG geographic unit level. Therefore, the indicator 804 indicates to users that they should consider using a larger territory for geospatial aggregation for this criteria.

The data certainty metric can be calculated utilizing a variety of different techniques depending upon whether the dataset has margin of error (MOE) calculations, the sample size of the data, and other such factors. MOE is a statistic representing the amount of random sampling error in the data. The $100*\alpha$ % MOE is the "distance" around the estimate such that you are $100*\alpha$ % confident that the true value of the parameter lies within that distance. For example, if one estimates that the number of single mothers in a selected geographic area is 100 with a 95% (i.e., $\alpha=0.95$) MOE of 10, that means that there is 95% confidence that the true number of single mothers in the selected geographic area lies between 90 and 110.

Figure 9:
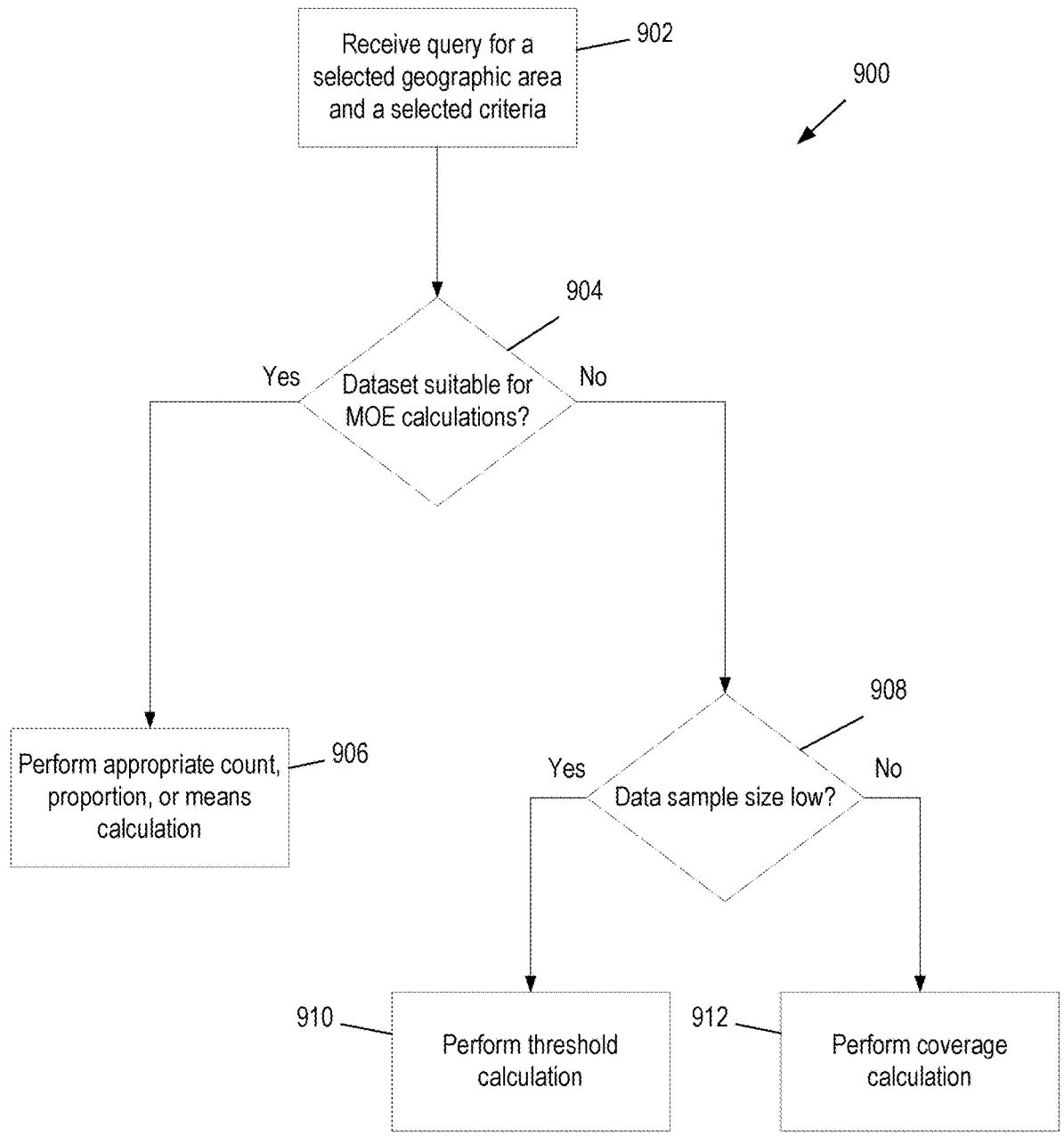
FIG. 9 illustrates a logic flow diagram of a process for calculating a certainty score for aggregated geospatial data for a selected geographic area, in accordance with at least one aspect of the present disclosure.

FIG. 9 shows an illustrative process 900 by which the back-end computer system 108 can calculate a data certainty metric. In the following description of the process 900, reference should also be made to FIG. 1. Accordingly, at step 902, the back-end computer system 108 executing the process 900 receives a query (e.g., from the user at the client 102) associated with a selected geographic area and a selected criteria. In one aspect, step 902 can be embodied by the process 200 illustrated in FIG. 3 and described above under the heading GEOGRAPHIC AREA DATA AGGREGATION. At step 904, the back-end computer system 108 determines whether the dataset returned from the query at step 902 is suitable for performing an MOE calculation. An MOE calculation can be utilized for datasets that include counts (e.g., the number of single mothers within a selected geographic area), means (e.g., the average income of the people with a selected geographic area), and proportions (e.g., the proportion of the people within a selected geographic area who own pets). If the dataset is suitable for performing an MOE calculation, then the process 900 proceeds along the YES branch to step 906. At step 906, the back-end computer system 108 performs the appropriate calculation according to the queried data type (e.g., counts, means, or proportions) to calculate a data certainty metric (i.e., a score) that relates to the relative reliability of the queried data.

In one aspect, a data certainty metric for a means data type (e.g., an average of some parameter) can be calculated by first calculating an MOE for the selected geographic area according to the following algorithm:

$$MOE_{selection} = \omega \frac{s_x}{\sqrt{np}} = MOE_{territory} \frac{1}{\sqrt{p}}$$

In the above, $MOE_{selection}$ is the MOE for a selected geographic area, $s_x$ is the sample standard deviation, n is the sample size (e.g., the total number of respondents within the territory for census data), p is the proportion of the selected territory as compared to the total territory, $\omega$ is a constant, and $MOE_{territory}$ is the MOE for the geographic unit or territory. Further, the MOE for a group of selected areas can be calculated according to the following algorithm:

$$MOE_A = \sqrt{\sum_{i=1}^{N} p_i(\text{territory}_i MOE)^2}$$

In the above, A is the area-weighted mean of N subsets of territories, and territory$_i$ MOE is the MOE for the ith territory of the group of selected areas. Based on these algorithms, a data certainty metric can be calculated according to the following algorithm:

$$\text{score} = \frac{MOE_{selection}}{\hat{\mu}_{selection}}$$

In the above, $\hat{\mu}_{selection}$ is the mean of the selected area. In one aspect, the data certainty metric (i.e., the above calculated score) can correspond to one or more thresholds, which in turn can be utilized to indicate to users (e.g., via the data certainty indicator 804) the relative reliability of the underlying data on which the response to the query was based. For example, the data certainty call fall within one of three zones:

First Zone: score≥T$_1$
Second Zone: T$_2$<score>T$_1$
Third Zone: score≤T$_2$

In the above, T$_1$ is a first threshold and T$_2$ is a second threshold. T$_1$ can be equal to 10% and T$_2$ can be equal to 5%, for example. In one aspect, if the score falls within the first zone, then the back-end computer system 108 can determine that it is uncertain of the returned data. Accordingly, the back-end computer system 108 can display the indicator 804 in the third state. In one aspect, if the score falls within the second zone, then the back-end computer system 108 can determine that it is moderately uncertain of the returned data. Accordingly, the back-end computer system 108 can display the indicator 804 in the second state. In one aspect, if the score falls within the first zone, then the back-end computer system 108 can determine that it is certain of the returned data. Accordingly, the back-end computer system 108 can display the indicator 804 in the first state.

In one aspect, a data certainty metric for a data type of a count of some parameter can be calculated by first considering the following probability mass function:

$$\int_0^\infty \binom{[n]}{k} p^k (1-p)^{[n]-k} \frac{1}{\hat{\sigma}\sqrt{2\pi}} e^{\frac{-(n-\mu)^2}{2\hat{\sigma}^2}} dnn$$

In the above, n is the sample size, p is the selected proportion of the territory area, k is the number of observed instances, $\hat{\sigma}$ is equal to $$\frac{MOE}{\beta}$$

(given that the distribution of the total count estimate is normal), β is a constant, μ is the territory count estimate, and [x] indicates x rounded to the nearest integer. For large μ, one may invoke the normal approximation to the binomial distribution to determine the variance of the statistic, which can be represented according to the following algorithm:

$$V[\hat{X}] = p(1-p)u + p^2\sigma^2$$

Based on this algorithm, a data certainty metric can be calculated according to the following algorithm (wherein variance is swapped for the square of the standard error):

$$\text{score} = \beta \cdot \frac{1}{N} SE[\hat{X}]^2 - \frac{\hat{X}^2}{\hat{N}^2} SE[\hat{N}]^2$$

In the above, S[x] represents the standard error of the selection count for x, $\hat{X}$ is the estimated count of the data parameter in the selected area, $\hat{N}$ is the estimated sample size in the selected area. As described above, the data certainty metric (i.e., the above calculated score) can correspond to one or more thresholds, which in turn can be utilized to indicate to users (e.g., via the data certainty indicator 804) the relative reliability of the underlying data on which the response to the query was based.

In one aspect, a data certainty metric for a data type of a proportion of some parameter can be calculated according to the same algorithm as described above for counts:

$$\text{score} = \beta \cdot \frac{1}{N} SE[\hat{X}]^2 - \frac{\hat{X}^2}{\hat{N}^2} SE[\hat{N}]^2$$

As described above, the data certainty metric (i.e., the above calculated score) can correspond to one or more thresholds, which in turn can be utilized to indicate to users (e.g., via the data certainty indicator 804) the relative reliability of the underlying data on which the response to the query was based.

Returning to step 904 of the process 900, if the dataset does not have MOE calculations, then the process proceeds along the NO branch to step 908. At step 908, the back-end computer system 108 determines whether the sample size of the data is low. In one aspect, the back-end computer system 108 can determine that the data sample size is low if the sample size falls below a threshold value. In another aspect, the back-end computer system 108 can determine that the data sample size is low if the sample size contains more than a threshold number of entries that occur 0 or 1 times within the data set for the queried parameter (i.e., indicating that there is a high degree of data sparsity within the data set). If the sample size of the data set is low, then the process 900 proceeds along the YES branch to step 910. At step 910, the back-end computer system 108 performs a threshold calculation. In the threshold calculation, the back-end computer system 108 determines whether at least a threshold number or percentage (e.g., 50%) of the values for the queried parameter fall below a data value threshold. If the at least a threshold number or percentage (e.g., 50%) of the values for the queried parameter do not fall below the data value threshold, then the back-end computer system 108 can determine, for example, that the data are moderately reliable (causing the data certainty indicator 804 to be displayed in the second state, e.g., colored yellow). If at least a threshold number or percentage (e.g., 50%) of the values for the queried parameter do fall below the data value threshold, then the back-end computer system 108 can determine, for example, that the data are unreliable (causing the data certainty indicator 804 to be displayed in the third state, e.g., colored red).

Returning to step 908 of the process 900, if the sample size of the data set is not low, then the process 900 proceeds along the NO branch to step 912. At step 912, the back-end computer system 108 performs a coverage calculation. In the coverage calculation, the back-end computer system 108 determines whether the selected geographic area contains at least a threshold number or percentage (e.g., 50%) of fully enclosed geographic units. If the selected geographic area does include at least a threshold of fully enclosed shapes, then the back-end computer system 108 can determine, for example, that the data are moderately reliable (causing the data certainty indicator 804 to be displayed in the second state). If the selected geographic area does not include at least a threshold number of fully enclosed geographic units, then the back-end computer system 108 can determine, for example, that the data are unreliable (causing the data certainty indicator 804 to be displayed in the second state). For example, in FIG. 4 the map 122 includes both fully enclosed geographic units 406 (i.e., geographic units 406 that lie entirely within the boundary of the selected geographic area 404) and partially enclosed geographic units 406 (i.e., geographic units 406 that only fall partially within the boundary of the selected geographic area 404). In an exemplification where the threshold percentage for the coverage calculation performed at step 912 is 50%, the back-end computer system 108 would determine at step 912 that the particular selected geographic area 404 does not contain at least a threshold percentage of fully enclosed geographic units (because of the nine geographic units 406 falling within the selected geographic area 404, only one is fully enclosed). The back-end computer system 108 could thus determine for the example shown in FIG. 4 that the data was unreliable according to the illustrated process 900.

Point Data Ranking and Filtering

In another aspect, the back-end computer system 108 can further be programmed to calculate a ranked and filtered list of locations based on selected criteria. In implementations where multiple criteria are selected, differential weights can also be provided to each of the selected criteria. The locations can be identified by, for example, addresses. The back-end computer system 108 can perform this analysis on geospatial data that includes at least one geolocation attribute and at least one additional attribute. The selected criteria by which the geospatial data are ranked and filter can include geoproximity classification (e.g., distance from a point or existence within a selected geographic area), categorical attributes (e.g., gender, occupation, or North American Industry Classification System (NAICS) code), numerical attributes (e.g., number of employees, age, or years at location), temporal Attributes (e.g., year founded, date of last activity, or timestamp), or natural language attributes (e.g., comments or biographies). The criteria by which the locations are ranked can be different or the same as the criteria by which the locations are filtered. In one implementation, the back-end computer system 108 could be programmed to output a lead list with ranked locations in order of best fit with the selected criteria and with all locations that do not fit the desired output filtered out. For example, the back-end computer system 108 could output a ranked list of households likely to switch to electronic billing based upon propensity to donate to environmental causes, comfort with technology, and level of education, with any households that do not own computers or smartphones filtered from the results.

FIG. 11 shows an illustrative process 1000 by which the back-end computer system 108 can calculate scores for and rank aggregated geospatial data. In the following description of the process 1000, reference should also be made to FIG. 1. Accordingly, at step 1002, the back-end computer system 108 executing the process 1000 receives a query for multiple selected criteria within a database of the user's choice. As noted above, the back-end computer system 108 can be communicably coupled to multiple different databases storing a variety of different types of geospatial data. Therefore, allowing users to select which database they are searching within allows them to search for the desired information. Users further have the option to filter the queried data within their database of choice based upon a selected geographic area and/or particular criteria. At step 1004, the back-end computer system 108 receives particular criteria and/or geographic area for filtration of results, which collectively can be referred to as "filtration criteria." For example, the results returned by the process 1000 can be filtered to a particular selected geographic area. In aspects where the results are limited to a selected geographic area, step 1002 and step 1004 can be embodied by the process 200 illustrated in FIG. 3 and described above under the heading GEOGRAPHIC AREA DATA AGGREGATION. As another examples, the results returned by the back-end computer system 108 can be filtered according to whether a particular criteria has a particular value or data entry (e.g., filtering households that do not own a computer or smartphone) or how a particular criteria compare to a threshold (e.g., filtering households that do contain an individual having at least a college degree). Further, the back-end computer system 108 can filter the results based upon one or multiple criteria. However, step 1004 for filtering the results is optional and can be skipped if the user has not selected a geographic area and/or criteria for filtering the results. The criteria and/or selected geographic area for filtering the results can be selected by the user through the GUI 120 displayed on the client 102 as provided by the back-end computer system 108.

At step 1006, the back-end computer system 108 receives weights for each of the selected criteria of the query. The weights can be selected by the user through the GUI 120 displayed on the client 102 as provided by the back-end computer system 108. For example, the GUI 120 can provide users with sliders or fields for controlling the relative weights between the selected criteria.

Figure 12:
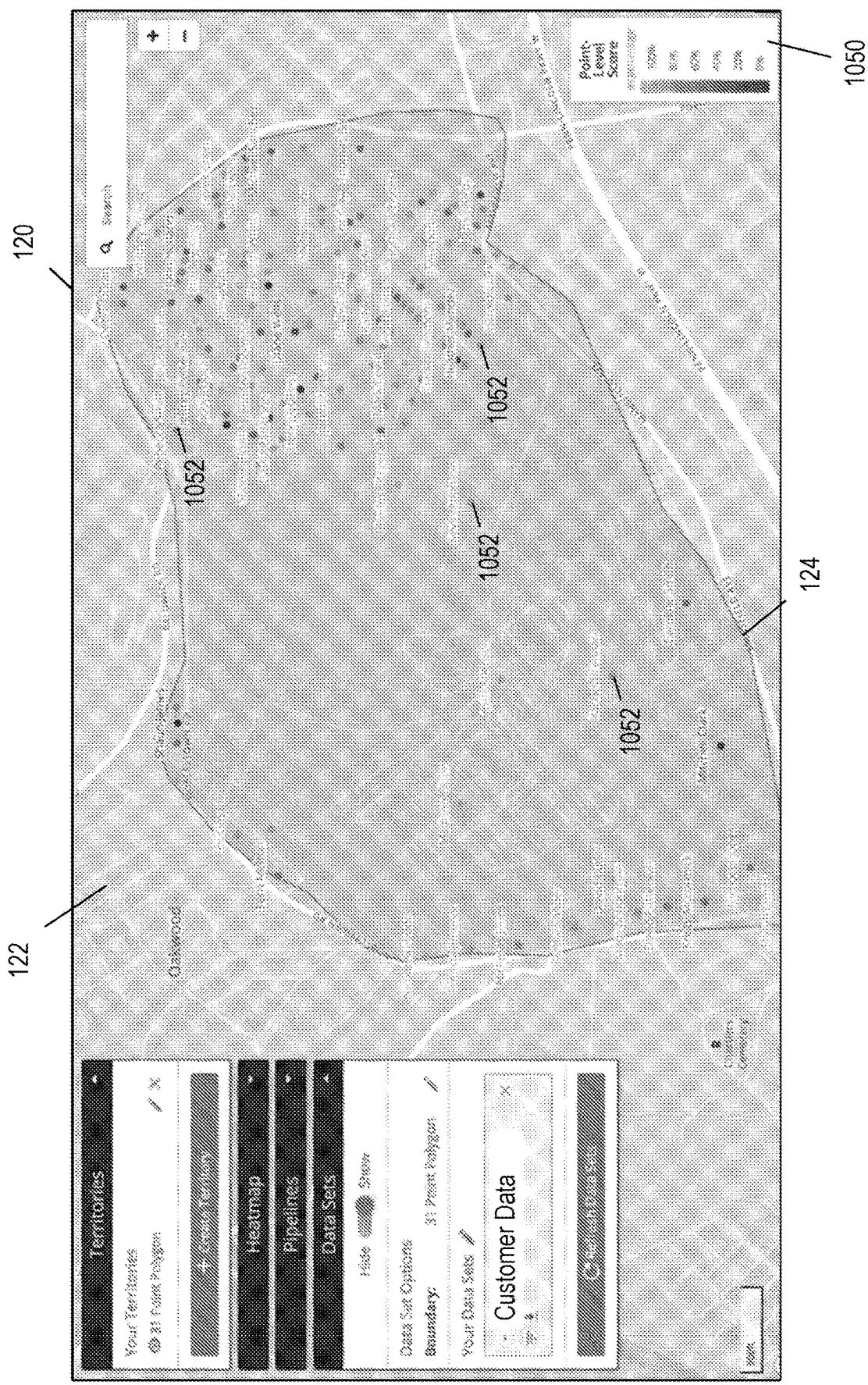
FIG. 12 illustrates a GUI displaying a map including rankings of customer records meeting a selected set of criteria, in accordance with at least one aspect of the present disclosure.

At step 1008, the back-end computer system 108 calculates a score for each record according to the weights for each criteria. The scores calculated by the back-end computer system 108 can be normalized scores that are calculated in the manner described above under the heading DATA SCORING ACCORDING TO SELECTED CRITERIA, for example. The weights applied to each of the criteria can be applied to each of the different criteria to affect the relative weight of each criteria prior to it being summed to a final, normalized score. At step 1010, the back-end computer system 108 displays a ranking of the records according to the calculated scores from step 1008. For example, the results can be displayed as a ranked list. As another example, the results can be displayed on the map 122 of the GUI 120, as illustrated in FIG. 12. FIG. 12 is an illustrative implementation of the process 1000 utilized to rank customer records (which, in this case, include the locations 1052 of the customers' households as a geospatial attribute) within a database by simulated income and simulated propensity to be an early technology adopter, filtered to be within the boundaries of a selected geographic area 124, where the customer records returned as results are color-coded according to a scale 1050 to visually indicate their ranking. In one aspect, these results can further be downloaded as a ranked list and/or table (e.g., a spreadsheet or CSV file).

Geospatial Proximity Filtering

In another aspect, the back-end computer system 108 can further be programmed to filter data records according to proximity to a geospatial location or set of geospatial locations. The geospatial location(s) can include any point, line segment, and/or shape defined by geospatial coordinates, which can include n-dimensional coordinates. Further, the geospatial location(s) can correspond to landmarks and/or infrastructure, such as pipelines, streets, electrical lines, store or business locations, customer locations, planes in flight, locations of satellites, and so on.

FIG. 13 shows an illustrative process 1100 by which the back-end computer system 108 can filter data records according to geospatial proximity to a location. In the following description of the process 1000, reference should also be made to FIG. 1. Accordingly, at step 1102, the back-end computer system 108 executing the process 1100 receives a geospatial location(s). At step 1104, the back-end computer system 108 receives a buffer distance (i.e., a distance tolerance) from the geospatial location(s) defining the geographic area within which the user wishes to search for data records from the database. The geospatial location(s) and/or buffer distance can be selected by the user through the GUI 120 displayed on the client 102 as provided by the back-end computer system 108. The user can input a geospatial location by inputting an address, loading shapes defined by geospatial attributes from a database to the back-end computer system 108, selecting a location on a map 122 (FIGS. 14A-14C) displayed by the GUI 120, and so on. The buffer distance can include, for example, a spatial distance (e.g., defined in feet, meters, miles, and so on), a travel distance with respect to the geospatial location(s), or geographic units encompassing, intersecting, and/or neighboring the geospatial location(s).

Figure 14A:
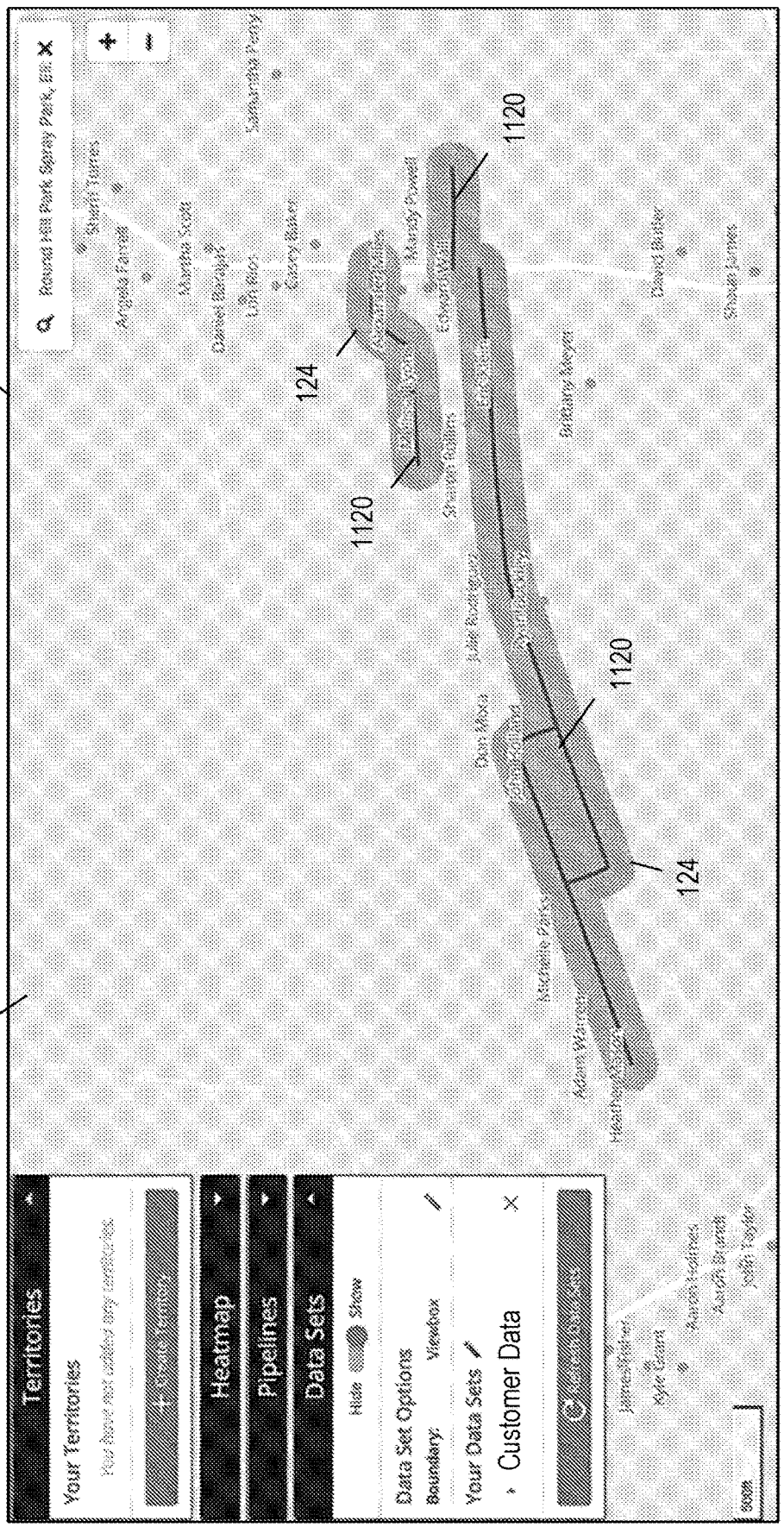
FIG. 14A illustrates a GUI displaying a map displaying customer records falling within a geographic area defined by a first buffer distance from a set of street segments, in accordance with at least one aspect of the present disclosure.
Figure 14B:
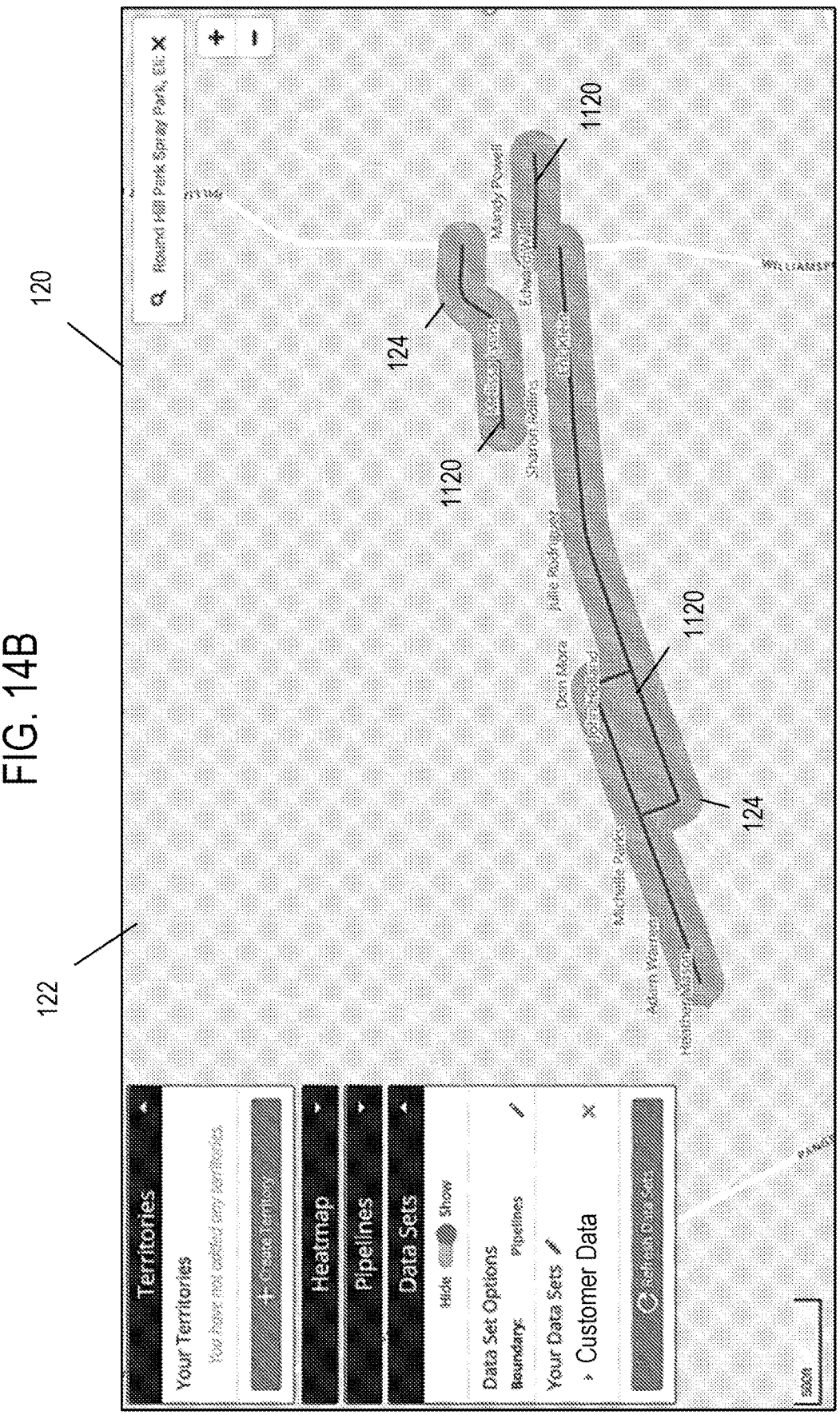
FIG. 14B illustrates the GUI of FIG. 14A with customer records partially within the geographic area filtered out.

At step 1106, the back-end computer system 108 calculates the geographic area corresponding to the received geospatial location(s) and the received buffer distance. At step 1108, the back-end computer system 108 can receive a query for the geographic area defined by step 1106. The query can be for all data records matching one or multiple selected criteria, as discussed above under the heading DATA AGGREGATION FOR A SELECTED GEOGRAPHIC AREA. For example, FIG. 14A illustrates a map 122 displayed on a GUI 120 where the user has selected a set of road segments 1120 as the geospatial locations from which the geographic area is calculated. Further, the user in this example queried a customer data database, which includes a set of customer records including a geospatial attribute (e.g., an address) identifying the customer's location, to return all customers lying within the selected geographic area 124. In one aspect, the results can be filtered according to whether a particular criteria has a particular value or data entry or how a particular criteria compare to a threshold. Further, the results can be filtered according to whether the data records are fully within the geographic area 124 defined by the buffer distance, partially within the geographic area 124, or outside of the geographic area 124. For example, FIG. 14B illustrates the GUI 120 of FIG. 14A, except where the user has elected to have the customer records only lying partially within the geographic area filtered out (e.g., the customer data records for "Ryan Buckley" and "Alexander Miles"). The size of the buffer distance can further affect the size and shape of the selected geographic area 124. For example, in the FIG. 14A the buffer distance has been set to 150 feet and in FIG. 14C the buffer distance has been set to 500 feet. In one aspect, these results can further be downloaded as, for example, a table (e.g., a spreadsheet or CSV file).

Figure 15A:
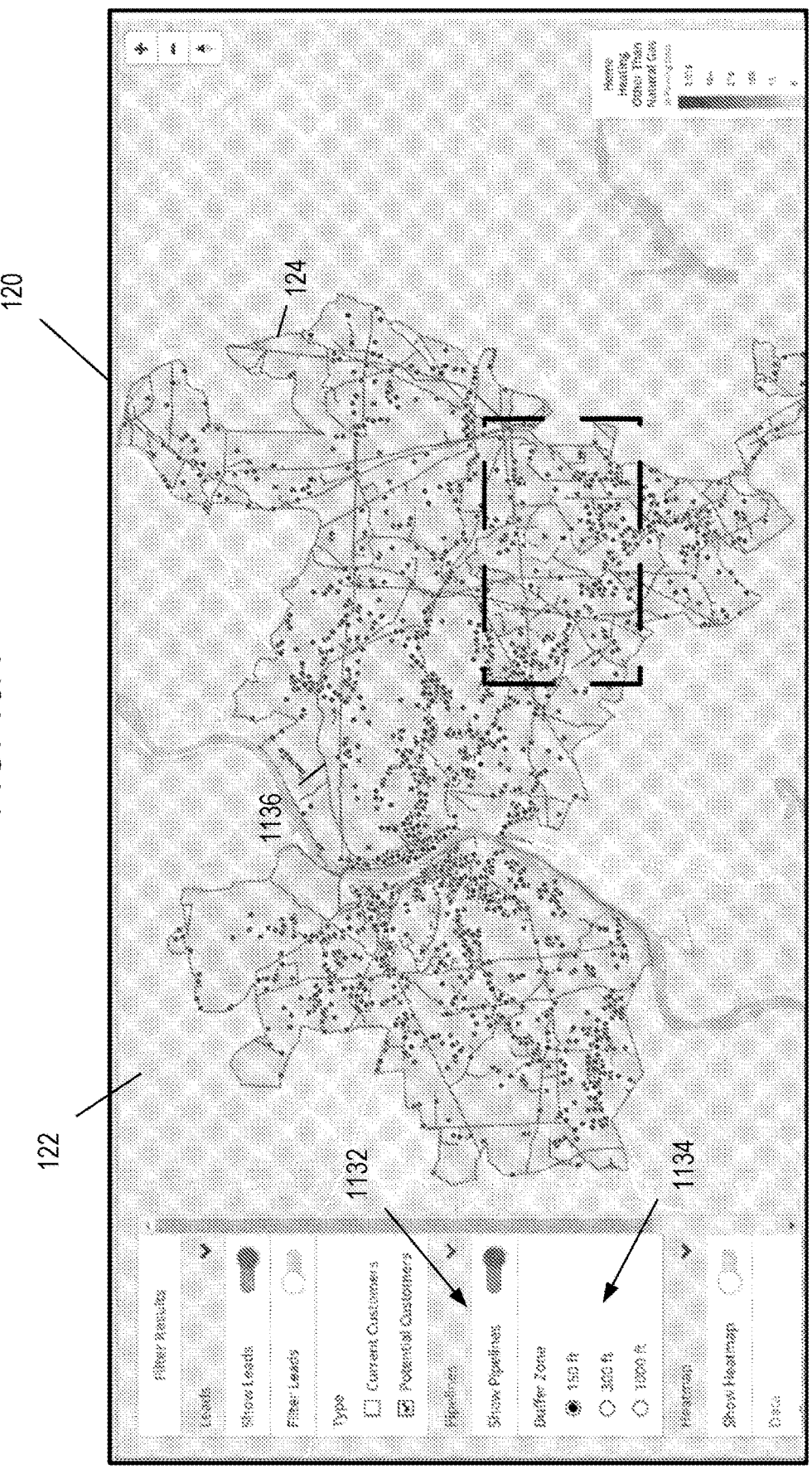
FIG. 15A illustrates a GUI displaying customer records falling within a selected geographic area that are within a buffer distance of piping infrastructure, in accordance with at least one aspect of the present disclosure.
Figure 15B:
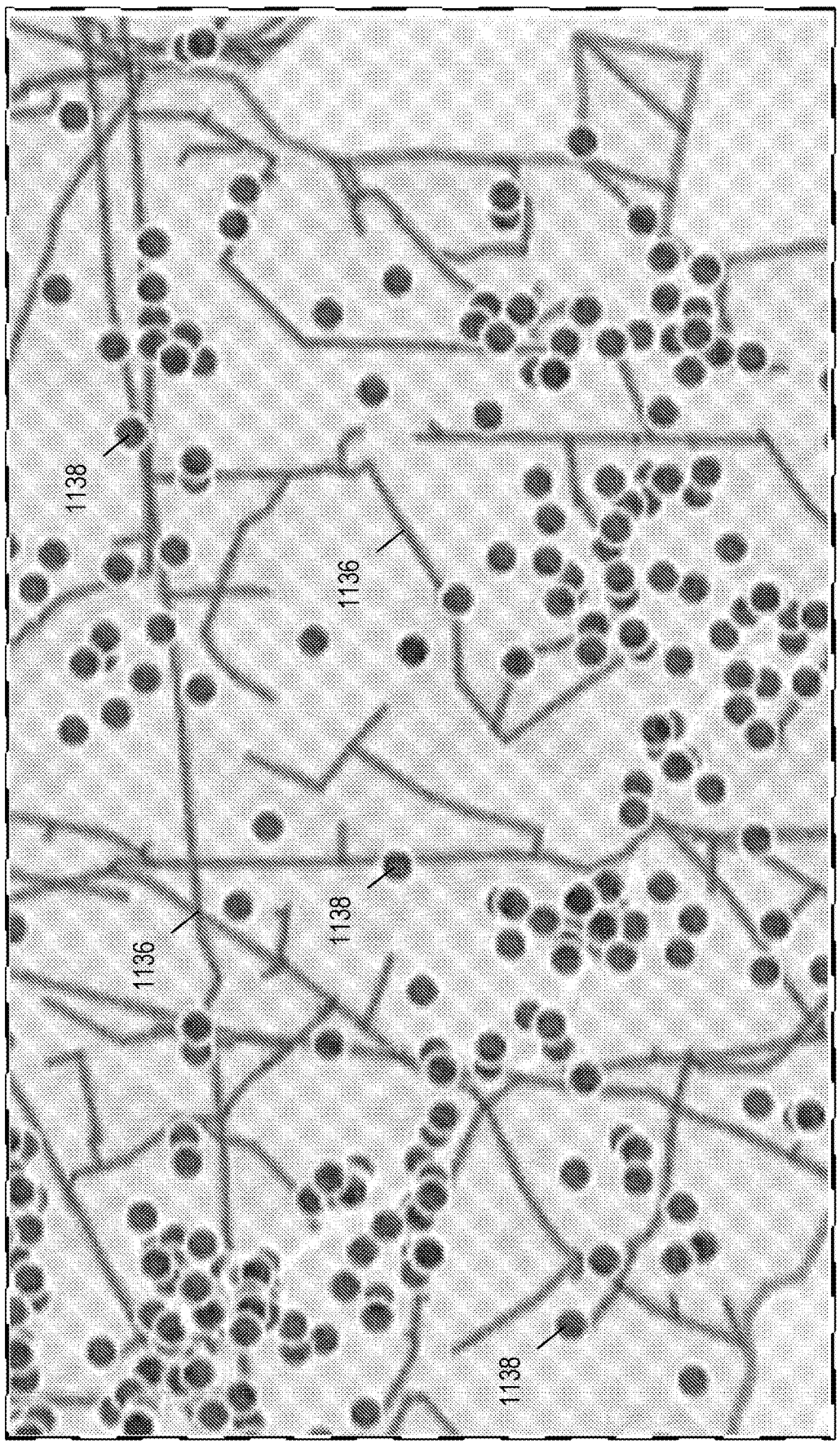
FIG. 15B illustrates a detail view of the GUI in FIG. 15A.

In another aspect, the back-end computer system 108 can be utilized to retrieve all of the data records from a database that fall within a buffer distance of a given set of geospatial location(s) that fall within a geographic area that has been selected via another technique, such as the techniques described above under the heading AREA SELECTION. For example, FIGS. 15A and 15B illustrate a selected geographic area 124 on a map 122 displayed by a GUI 120. As can be seen, the GUI 120 includes a pipeline widget 1132 for toggling the display of a set of pipelines (i.e., landmarks or geospatial locations based on which data can be geospatially filtered according to proximity thereto) retrievable by the back-end computer system 108 from a database and a buffer distance widget 1134 for selecting the buffer distance relative to the pipelines 1136. In this example, the GUI 120 can be utilized to view the data records 1138 within the selected geographic area 124 that correspond to a selected criteria (i.e., current customers or potential customers) and that are within the selected buffer distance from the pipelines 1136.

In various other aspects, the process 1100 illustrated in FIG. 13 can be utilized in addition to or in lieu of the techniques for selecting a geographic area that are described above under the heading AREA SELECTION.

User-Provided Data

In addition to performing analyses on the data that is made available to all users or subscribers of the back-end computer system 108, users may also upload or otherwise provide their own location data to be utilized in conjunction with the data available to all users for performing analyses. Users can provide, for example, internal or proprietary company data that is then uploaded to the database 104. Users can then analyze their internal or proprietary data in conjunction with any other datasets stored by the database 104 by interacting with the back-end computer system 108 through the GUI 120 provided thereby. The users' data can include, for example, data related to the users' business operations and the users' current or potential customers. The users' data can define, for example, various features or locations, such as piping, electrical wiring, communications infrastructure, store locations, (current or former) customer locations, and other landmarks.

When a user logs into or otherwise connects to the back-end computer system 108, the back-end computer system 108 can be programmed to recognize users that have uploaded their own data (e.g., according to a user login information) or that are otherwise associated with a client organization (e.g., an employee of the client organization) that has uploaded its own data. The back-end computer system 108 can then provide those users with the ability to run queries on the additional database(s) containing the user-provided data and/or additional criteria to select for performing analyses.

For example, FIGS. 15A and 15B can represent an implementation of the back-end computer system 108 where the user-provided data is for pipeline infrastructure that includes locations of pipelines 1136 defined by a set of geospatial locations. Based on this data uploaded to the back-end computer system 108, the user can perform queries to locate current or potential customers (e.g., households) that meet selected criteria and are within the buffer distance of the user-provided location data for the pipelines 1136. For example, the selected criteria can include households being heated by something other than natural gas in order to locate potential customers. It is necessary to geospatially filter households that are not currently customers based on proximity to the pipelines 1136 because it may be cost prohibitive to hook up a household to the existing pipelines 1136 if it is greater than a particular distance to the pipelines 1136. Therefore, it would be desirable to locate households that are both potentially customers and that would not be cost-prohibitive to convert to actual customers.

Client-provided location data can be utilized in connection with a variety of different techniques described herein to, for example, locate new customers (e.g., converting customers from the user's competitor or finding households that are not currently utilizing services from either the user or the user's competitors), determine areas into which the user may wish to extend its business operations (e.g., find a location for a new store that would be exposed to the user's desired customer base or determine where the client may wish to extend its existing infrastructure to gain exposure to new potential customers), or target current customers in a specifically defined manner (e.g., locate a subset of the user's customers meeting certain criteria for a directed mailing).

Third-Party Integration

In various aspects, the back-end computer system 108 can be configured to integrate with a variety of different types of third-party applications or platforms. For example, the back-end computer system 108 can be programmed to integrate with third-party marketing or mass-mailing systems, such as the US Postal Service's Everyday Direct Mail or Mailchimp to send targeted messages to entities (i.e., individuals, households, or businesses) identified by addresses. As another example, the back-end computer system 108 can be programmed to integrate with third-party advertising platforms, such as Facebook or Google Ads to send targeted messages or advertisements to entities identified by email addresses, web browser user credentials, and so on. Further, the back-end computer system 108 can send personalized messages or advertisements to individual entities or subgroups of entities that are selected according to particular criteria. The back-end computer system 108 can also send individualized on non-individualized messages to entities within a geographic area, which can be pre-selected or analytically optimized according to criteria selected by the user.

For example, the back-end computer system 108 can be programmed to output a set of physical addresses, email addresses, web browser user names, and other contact data for a selected geographic area and, optionally, a set of one or more selected criteria. The geographic area and criteria can be selected according to the techniques described above under the headings AREA SELECTION and/or GEOSPATIAL PROXIMITY FILTERING, for example. The back-end computer system 108 can then retrieve the data records satisfying the selected criteria for the selected geographic area according to the techniques described above under the heading DATA AGGREGATION FOR A SELECTED GEOGRAPHIC AREA, for example. Based on these and other techniques described herein, the back-end computer system 108 can output the contact data for the retrieved data records. In one aspect, the back-end computer system 108 can include an API that is configured to automatically submit the contact data to a third-party application (e.g., the Mailchimp platform or Google Ads) to then cause the third-party application to transmit messages to the entities identified by the contact data. The third-party application can be programmed, in some aspects, to provide confirmation to the back-end computer system 108 when and if the contact data are successfully received by the third-party application. The back-end computer system 108 can be programmed to then communicate that confirmation to the user. In another aspect, the back-end computer system 108 can be programmed to provide the contact data for download as, for example, an Excel or CSV file. Thereafter, users can manually input the data to a third-party marketing application, contact the listed entities directly, print off the contact data and input the contact data scanning, and so on.

Visualization Options

Figure 8B:
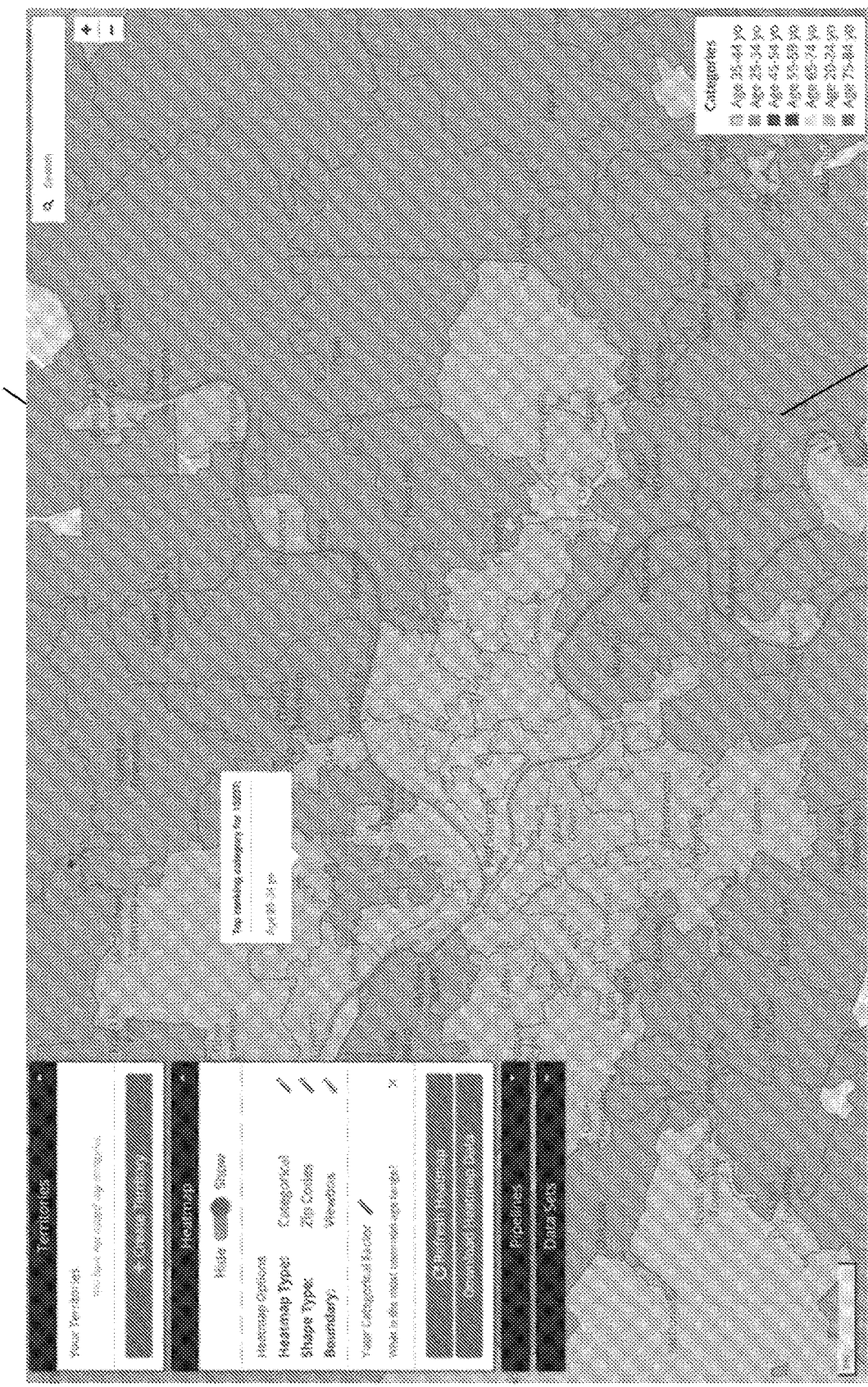
FIG. 8B illustrates a GUI displaying a categorical choropleth map for a selected geographic area, in accordance with at least one aspect of the present disclosure.
Figure 14C:
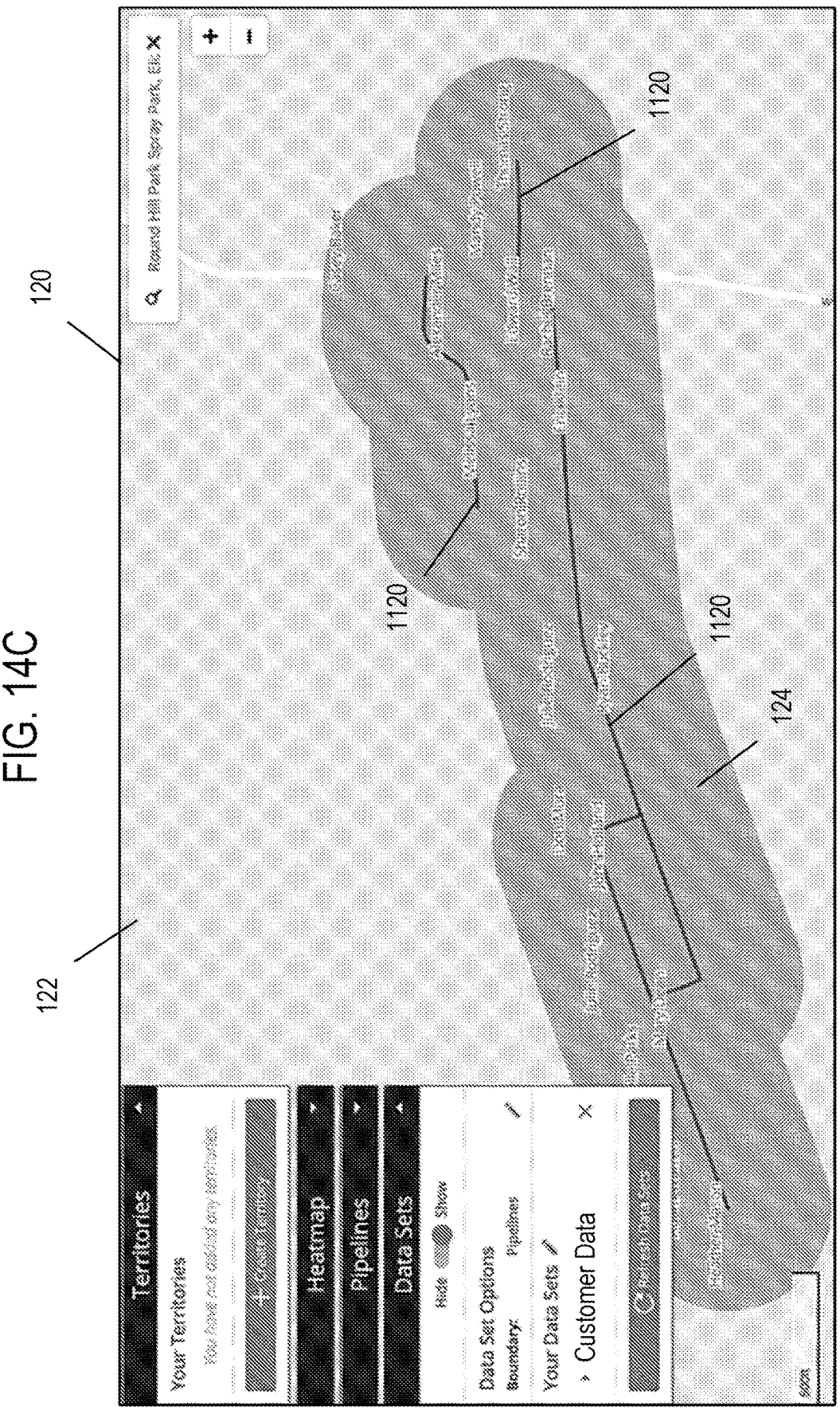
FIG. 14C illustrates a GUI displaying a map displaying customer records falling within a geographic area defined by a second buffer distance from a set of street segments, in accordance with at least one aspect of the present disclosure.

In one aspect, the output of the back-end computer system 108 executing the various processes described throughout can take the form of information visually displayed on the map 122. The information displayed on the map 122 can include areas that are shaded or patterned differently according to the value of a variable (i.e., a choropleth or heat map, e.g., as shown in FIGS. 8A and 8B), individual point data (e.g., as shown in FIG. 12), line segments with or without buffer areas that are shaded or patterned differently (e.g., as shown in FIGS. 14A-14C), visual result clustering, hot spots, or any other spatial data visualizations.

In another aspect, the output of the back-end computer system 108 executing the various processes described throughout can also take the form of reports visually displaying the retrieved and/or calculated information. The reports can include line charts, bar and column charts (e.g., as shown in FIGS. 10A-10C), pie charts, relationship graphs, or any other data visualization. After the generation of a report, the back-end computer system 108 can be programmed to further allow users to add and remove data series from the report, adjust the coloration of the report, change the visual output type of the report (e.g., change from a pie chart to a bar chart), or change the data output type (e.g., change the visualized data between raw counts, percentage, averages, medians, and so on). All of these various adjustment options can be presented to the user as controls displayed by the GUI 120 on the client 102 that, when controlled by the user, cause the back-end computer system 108 to make the indicated adjustment and then provide the updated report to the client 102 for display by the GUI 120.

In any of these aspects, the output of the back-end computer system 108 can be visually displayed by the GUI 120 during operation by the user, provided for download in a variety of different file formats for offline use by the user, or otherwise made available to the user.

EXAMPLES

Various aspects of the subject matter described herein are set out in the following aspects, implementations, and/or examples, which can be interchangeably combined together in various arrangements.

Example 1: A computer-implemented method for displaying geographic data for a client, where the method comprises the steps of: receiving, by a back-end computer system, a selection of a geographic area on a map displayed by the client, where the selected geographic area comprises at least a portion of one or more geographic units; receiving, by the back-end computer system, a selected data criteria; retrieving, by the back-end computer system, data satisfying the selected data criteria for the one or more geographic units from a geospatial dataset, where the geospatial dataset comprises a plurality of data records and each data record of the geospatial dataset includes at least one geospatial attribute and the data are retrieved from the data records based on the geospatial attributes; and aggregating, by the back-end computer system, the retrieved data corresponding to the selected data criteria according to a degree to which each of the one or more geographic units overlaps with the selected geographic area.

Example 2. A computer system that comprises a processor and a memory coupled to the processor. The memory stores a geospatial database and instructions that, when executed by the processor, cause the computer system to: receive a selection of a geographic area on a map displayed by the client, where the selected geographic area comprises at least a portion of one or more geographic units; receive, by the back-end computer system, a selected data criteria; retrieve data satisfying the selected data criteria for the one or more geographic units from a geospatial dataset, where the geospatial dataset comprises a plurality of data records and each data record of the geospatial dataset includes at least one geospatial attribute and the data are retrieved from the data records based on the geospatial attributes; and aggregate the retrieved data corresponding to the selected data criteria according to a degree to which each of the one or more geographic units overlaps with the selected geographic area.

Example 3. The method or system of Examples 1 and 2, further comprising the step of determining, by the back-end computer system or the processor, a certainty in the retrieved data for each of the one or more geographic units according to a size of each of the one or more geographic units within the selected geographic area.

Example 4. The method or system of Example 3, where the step of determining the certainty in the retrieved data comprises: determining, by the back-end computer system or the processor, whether the geospatial dataset is suitable for a margin of error calculation for the selected data criteria; and upon a determination that the geospatial dataset is suitable for the margin of error calculation, calculating, by the back-end computer system or the processor, the certainty in the retrieved data according to the margin of error calculation.

Example 5. The method or system of Example 3, where the step of determining the certainty in the retrieved data comprises: determining, by the back-end computer system or the processor, whether the geospatial dataset is suitable for a margin of error calculation for the selected data criteria; and upon a determination that the geospatial dataset is not suitable for the margin of error calculation, determining, by the back-end computer system or the processor, whether a sample size of the geospatial dataset is below a threshold for the selected criteria; and upon a determination that the sample size is below the threshold, calculating, by the back-end computer system or the processor, a threshold calculation for the selected criteria.

Example 6. The method or system of Example 3, where the step of determining the certainty in the retrieved data comprises: determining, by the back-end computer system or the processor, whether the geospatial dataset is suitable for a margin of error calculation for the selected data criteria; and upon a determination that the geospatial dataset is not suitable for the margin of error calculation, determining, by the back-end computer system or the processor, whether a sample size of the geospatial dataset is below a threshold for the selected criteria; and upon a determination that the sample size is above the threshold, calculating, by the back-end computer system or the processor, a coverage calculation for the selected criteria.

Example 7. Any of the prior Examples 1-6 where the selection comprises a drawing on the map.

Example 8. Any of Examples 1-6, where the selection comprises a travel distance from a point on the map.

Example 9. Any of Examples 1-6, where the selection comprises a shape on the map.

Example 10. Any of the prior Examples 1-9 where the step of aggregating the retrieved data comprises calculating, by the back-end computer system or the processor, a weighted average for each of the one or more geographic units that partially overlaps with the area according to the degree to which each partially overlapping geographic unit overlaps with the area.

Example 11. Any of Examples 1-9, where the step of aggregating the retrieved data comprises: for each geographic unit lying only partially within the selection of the geographic area: (i) retrieving, by the back-end computer system or the processor, one or more smaller geographic units for each geographic unit; and (ii) retrieving, by the back-end computer system or the processor, data satisfying the selected data criteria for the one or more smaller geographic units from the geospatial dataset.

Example 12. Any of Examples 1-9, where the step of aggregating the retrieved data comprises, for each geographic unit lying only partially within the selection of the geographic area, calculating, by the back-end computer system or the processor, a weighted average for the selected data criteria according to the degree to which each of the geographic unit overlaps with the selected geographic area.

Example 13. Any of the prior Examples 1-12, further comprising the steps of:
(i) calculating, by the back-end computer system or the processor, a normalized score for the selected data criteria; and (ii) providing, by the back-end computer system or the processor, a choropleth map of the selected geographic area for display by the client, wherein the choropleth map comprises an indicia applied to each of the geographic units within the selected geographic area according to the corresponding normalized score.

Example 14. Any of the prior Examples 1-13, where the selected data criteria comprises a first selected data criteria, the method/system further comprises: receiving, by the back-end computer system or the processor, a second selected data criteria; retrieving, by the back-end computer system or the processor, data satisfying the second selected data criteria for the selected geographic area from a geospatial dataset; calculating, by the back-end computer system or the processor, a normalized score for the first selected data criteria and the second selected data criteria; and providing, by the back-end computer system or the processor, a choropleth map of the selected geographic area for display by the client, wherein the choropleth map comprises an indicia applied to each of the geographic units within the selected geographic area according to the corresponding normalized score.

Example 15: The method/system of Example 14, further comprising: receiving, by the back-end computer system or the processor, a weight factor for each of the first selected data criteria and the second selected data criteria; and calculating, by the back-end computer system or the processor, the normalized score for the first selected data criteria and the second selected data criteria according to each respective weight factor.

Example 16. The method/system of any of Examples 1-13, where the selected data criteria comprises a first selected data criteria, and the method/system further comprises: receiving, by the back-end computer system or the processor, a second selected data criteria; receiving, by the back-end computer system or the processor, a weight for each of the first selected data criteria and the second selected data criteria; retrieving, by the back-end computer system or the processor, data satisfying the first selected data criteria and the second selected data criteria for the selected geographic area from a geospatial dataset; calculating, by the back-end computer system or the processor, a score for the retrieved data based on the weight for each of the first selected data criteria and the second selected data criteria; and displaying, by the back-end computer system or the processor, a ranked list for the retrieved data according to the calculated scores.

Example 17. The method/system of Example 16, where calculating the score for the retrieved data comprises: calculating, by the back-end computer system or the processor, a first score for each record of the retrieved data based on the weight for the first selected data criteria; calculating, by the back-end computer system or the processor, a second score for each record of the retrieved data based on the weight for the second first selected data criteria; and summing, by the back-end computer system or the processor, the first score and the second score for each record of the retrieved data.

Example 18. The method/system of Examples 1-7, where receiving the selection of the geographic area comprises: receiving, by the back-end computer system or the processor, a geospatial location; receiving, by the back-end computer system or the processor, a buffer distance; and determining, by the back-end computer system or the processor, the selection of the geographic area corresponding to the buffer distance from the geospatial location.

Example 19. The method/system of Example 18, where the geospatial location corresponds to a geospatial location of infrastructure, a geospatial location of a business, and/or a geospatial location of a customer.

Example 20. The method/system of Examples 1-19, further comprising the step of filtering, by the back-end computer system or the processor, from the retrieved data any data records not satisfying a filtration criteria.

Referring back to FIG. 1, the processes described herein (e.g., the process 200 of FIG. 3, the process 500 of FIG. 6, the process 900 of FIG. 9, the process 1000 of FIG. 11, or the process 1100 of FIG. 13) can be executed by hardware, software, and/or firmware of a computer system, such as the processor 110 of the back-end computer system 108. Accordingly, the processes can be embodied as a set of computer executable instructions stored in a memory 112 of the back-end computer system 108 that, when executed by the processor 110, cause the back-end computer system 108 to perform the described steps. Further, each described step in the processes can be representative of one or multiple software modules programmed to cause the back-end computer system 108 to perform that particular step. Still further, although the processes are described as being executed by a processor 110, this is merely for brevity, and it should be understood that the described processes can also be executed across multiple processors or computers. For example, the described processes can be executed by multiple computers that are communicably connected as a distributed computer system, such as in a cloud computing architecture.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

When a component is described as being "communicatively coupled" or "communicably coupled" to one or more other components, the components are coupled such that they are able to send and/or receive signals therebetween, the signals being capable of transmitting information for processing by any of the connected components or a separate component. Unless stated otherwise, components can be communicatively coupled via either wired or wireless connections. Furthermore, such connections can be configured to transmit analog signals, digital signals, or any type of signal electrically, electronically, or via any other such means. When a component is described as being "operably coupled" to one or more other components, the components are coupled such that there is a functional relationship between the components, i.e., the components are connected in a manner such that they perform the designated function.

Parts of this disclosure may be presented in terms of instructions that operate on data stored in a computer memory. An algorithm or process refers to a self-consistent sequence of steps leading to a desired result, where a "step" refers to a manipulation of physical quantities that may take the form of electrical or magnetic signals capable of being stored, transferred, combined, compared, and otherwise manipulated. These signals may be referred to as bits, values, elements, symbols, characters, terms, and/or numbers. These and similar terms may be associated with the appropriate physical quantities and are merely convenient labels applied to these quantities.

The foregoing description has set forth aspects of devices and/or processes via the use of block diagrams, flowcharts, and/or examples, which may contain one or more functions and/or operations. Each function and/or operation within such block diagrams, flowcharts, or examples can be implemented, individually and/or collectively, by a wide range of hardware, software, firmware, or virtually any combination thereof. In one aspect, several portions of the subject matter described herein, such as the controller, may be implemented via Application Specific Integrated Circuits (ASICs), Field Programmable Gate Arrays (FPGAs), digital signal processors (DSPs), Programmable Logic Devices (PLDs), circuits, registers, software components (e.g., programs, subroutines, or logic), and/or combinations of hardware and software components, logic gates, or other integrated formats. Some aspects disclosed herein, in whole or in part, can be equivalently implemented in integrated circuits, as one or more computer programs running on one or more computers (e.g., as one or more programs running on one or more computer systems), as one or more programs being executed by one or more processors (e.g., as one or more programs running on one or more microprocessors), as firmware, or as virtually any combination thereof. Designing the circuitry and/or writing the code for the software and or firmware would be well within the skill of one of skill in the art in light of this disclosure.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

In summary, numerous benefits have been described, which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

The invention claimed is:

1. A computer-implemented method for displaying geographic data for a client, the method comprising:
    receiving, by a back-end computer system, a selection of a user-defined geographic area on a user-manipulatable input map displayed by the client, wherein the user-manipulatable input map is configurable for a user to select the user-defined geographic area based on a pathway for a pipeline;
    determining, by the back-end computer system, a geographic boundary that encompasses the pathway for the pipeline, wherein the geographic boundary is based on a buffer distance from the user-defined geographic area and potential customers served by the pipeline, and wherein the geographic boundary comprises at least a portion of one or more geographic units;
    transmitting, by the back-end computer system, the geographic boundary and the pathway of the pipeline to be displayed on the user-manipulatable input map of the client;
    receiving, by the back-end computer system, a selected data criteria;
    retrieving, by the back-end computer system, retrieved data satisfying the selected data criteria for the one or more geographic units from a geospatial dataset, wherein the geospatial dataset comprises a plurality of data records and each data record of the geospatial dataset includes at least one geospatial attribute and the retrieved data are retrieved from the data records based on the geospatial attributes;
    calculating, by the back-end computer system, a calculated data criteria for the retrieved data corresponding to the selected data criteria according to a proportional degree to which each of the one or more geographic units overlaps with the geographic boundary, and wherein the calculated data criteria is representative of the geographic boundary;
    determining, by the back-end computer system, a certainty in the retrieved data for each of the one or more geographic units according to a size of each of the one or more geographic units within the geographic boundary;
    determining, by the back-end computer system, whether the geospatial dataset is suitable for a margin of error calculation for the selected data criteria;
    upon a determination that the geospatial dataset is suitable for the margin of error calculation, calculating, by the back-end computer system, the certainty in the retrieved data according to the margin of error calculation to determine the certainty in the retrieved data; and
    upon a determination that the geospatial dataset is not suitable for the margin of error calculation, determining, by the back-end computer system, whether a sample size of the geospatial dataset meets a threshold for the selected criteria; and
    transmitting, by the back-end computer system, the calculated data criteria for the selected data criteria within the geographic boundary to the client for display by the client of the calculated data criteria.

2. The method of claim 1, wherein determining the certainty in the retrieved data comprises:
    upon a determination that the sample size is below the threshold, calculating, by the back-end computer system, a threshold calculation for the selected criteria.

3. The method of claim 1, wherein determining the certainty in the retrieved data comprises:
    upon a determination that the sample size is above the threshold, calculating, by the back-end computer system, a coverage calculation for the selected criteria.

4. The method of claim 1, wherein calculating the calculated data criteria comprises:
    calculating, by the back-end computer system, a weighted average for each of the one or more geographic units that partially overlaps with the geographic boundary according to the proportional degree to which each partially overlapping geographic unit overlaps with the geographic boundary.

5. The method of claim 1, wherein calculating the calculated data criteria comprises:
for each geographic unit lying only partially within the geographic boundary:
    retrieving, by the back-end computer system, one or more smaller geographic units for each geographic unit; and
    retrieving, by the back-end computer system, data satisfying the selected data criteria for the one or more smaller geographic units from the geospatial dataset.

6. The method of claim 1, wherein calculating the calculated data criteria comprises:
    for each geographic unit lying only partially within the selection of the user-defined geographic area:
    calculating, by the back-end computer system, a weighted average for the selected data criteria according to the proportional degree to which each of the geographic unit overlaps with the geographic boundary.

7. The method of claim 1, further comprising:
    calculating, by the back-end computer system, a normalized score for the selected data criteria; and
    providing, by the back-end computer system, an output choropleth map of the geographic boundary for display by the client, wherein the choropleth map comprises an indicia applied to each of the geographic units within the geographic boundary according to the normalized score.

8. The method of claim 1, wherein the selected data criteria comprises a first selected data criteria, the method further comprising:
receiving, by the back-end computer system, a second selected data criteria;
retrieving, by the back-end computer system, data satisfying the second selected data criteria for the geographic boundary from the geospatial dataset;
calculating, by the back-end computer system, a normalized score for the first selected data criteria and the second selected data criteria; and
providing, by the back-end computer system, an output choropleth map of the geographic boundary for display by the client, wherein the choropleth map comprises an indicia applied to each of the geographic units within the geographic boundary according to the normalized score.

9. The method of claim 8, further comprising:
receiving, by the back-end computer system, a weight factor for each of the first selected data criteria and the second selected data criteria; and
calculating, by the back-end computer system, the normalized score for the first selected data criteria and the second selected data criteria according to each respective weight factor.

10. The method of claim 1, wherein the selected data criteria comprises a first selected data criteria, the method further comprising:
receiving, by the back-end computer system, a second selected data criteria;
receiving, by the back-end computer system, a weight for each of the first selected data criteria and the second selected data criteria;
retrieving, by the back-end computer system, data satisfying the first selected data criteria and the second selected data criteria for the geographic boundary from the geospatial dataset;
calculating, by the back-end computer system, a score for the retrieved data based on the weight for each of the first selected data criteria and the second selected data criteria; and
displaying, by the back-end computer system, a ranked list for the retrieved data according to the calculated scores.

11. The method of claim 10, wherein calculating the score for the retrieved data comprises:
calculating, by the back-end computer system, a first score for each record of the retrieved data based on the weight for the first selected data criteria;
calculating, by the back-end computer system, a second score for each record of the retrieved data based on the weight for the second selected data criteria; and
summing, by the back-end computer system, the first score and the second score for each record of the retrieved data.

12. The method of claim 1, wherein receiving the selection of the user-defined geographic area comprises:
displaying a graphical user interface (GUI) on the client, wherein the GUI comprises a map and a menu of user-defined geographic area selection definition options through which the user-defined geographic area are definable relative to the map, where the user-defined geographic area definition options comprise:
a first option to define the user-defined geographic area via free form drawing on the map, where the free form drawing defines the pathway for a pipeline; and
a second option to define the user-defined geographic area by applying a geometric shape to the map, wherein the geometric shape defines the pathway for a pipeline.

13. The method of claim 1, further comprising:
identifying, based on the calculated data criteria, a new potential customer household for the pipeline.

14. A computer system for displaying geographic data for a client, the computer system comprising:
a processor; and
a memory coupled to the processor, the memory storing a geospatial database and instructions that, when executed by the processor, cause the computer system to:
receive a selection of a user-defined geographic area on a user-manipulatable input map displayed by the client, wherein the user-manipulatable input map is configurable for a user to select the user-defined geographic area based on a pathway for a pipeline;
determine a geographic boundary that encompasses the pathway for the pipeline, wherein the geographic boundary is based on a buffer distance from the user-defined geographic area and potential customers served by the pipeline, and wherein the geographic boundary comprises at least a portion of one or more geographic units;
transmit the geographic boundary and the pathway of the pipeline to be displayed on the user-manipulatable input map of the client;
receive a selected data criteria;
retrieve data satisfying the selected data criteria for the one or more geographic units from a geospatial dataset, wherein the geospatial dataset comprises a plurality of data records and each data record of the geospatial dataset includes at least one geospatial attribute and the data are retrieved from the data records based on the geospatial attributes;
calculate a calculated data criteria for the retrieved data corresponding to the selected data criteria according to a proportional degree to which each of the one or more geographic units overlaps with the geographic boundary, and wherein the calculated data criteria is representative of the geographic boundary;
determine a certainty in the retrieved data for each of the one or more geographic units according to a size of each of the one or more geographic units within the geographic boundary;
determine whether the geospatial dataset is suitable for a margin of error calculation for the selected data criteria;
upon a determination that the geospatial dataset is suitable for the margin of error calculation, calculate the certainty in the retrieved data according to the margin of error calculation to determine the certainty in the retrieved data; and
upon a determination that the geospatial dataset is not suitable for the margin of error calculation, determine whether a sample size of the geospatial dataset meets a threshold for the selected criteria; and
transmit the calculated data criteria for the selected data criteria within the geographic boundary to the client for display by the client of the calculated data criteria.

15. The computer system of claim 14, wherein the instructions, when executed by the processor, further cause the computer system to:

upon a determination that the sample size is below the threshold, calculate a threshold calculation for the selected criteria to determine the certainty in the retrieved data.

16. The computer system of claim 14, wherein the instructions, when executed by the processor, further cause the computer system to:
upon a determination that the sample size is above the threshold, calculate a coverage calculation for the selected criteria to determine the certainty in the retrieved data.

17. The computer system of claim 14, wherein the instructions, when executed by the processor, further cause the computer system to:
calculate a weighted average for each of the one or more geographic units that partially overlaps with the geographic boundary according to the proportional degree to which each partially overlapping geographic unit overlaps with the geographic boundary to aggregate the retrieved data.

18. The computer system of claim 14, wherein the instructions, when executed by the processor, further cause the computer system to:
for each geographic unit lying only partially within the selection of the user-defined geographic area:
retrieve one or more smaller geographic units for each geographic unit; and
retrieve data satisfying the selected data criteria for the one or more smaller geographic units from the geospatial dataset to aggregate the retrieved data.

19. The computer system of claim 14, wherein the instructions, when executed by the processor, further cause the computer system to:
for each geographic unit lying only partially within the geographic boundary:
calculate a weighted average for the selected data criteria according to the proportional degree to which each of the geographic unit overlaps with the geographic boundary to aggregate the retrieved data.

20. The computer system of claim 14, wherein the instructions, when executed by the processor, further cause the computer system to:
calculate a normalized score for the selected data criteria; and
provide an output choropleth map of the geographic boundary for display by the client, wherein the choropleth map comprises an indicia applied to each of the geographic units within the geographic boundary according to the normalized score.

21. The computer system of claim 14, wherein the selected data criteria comprises a first selected data criteria and wherein the instructions, when executed by the processor, further cause the computer system to:
receive a second selected data criteria;
retrieve data satisfying the second selected data criteria for the geographic boundary from a geospatial dataset;
calculate a normalized score for the first selected data criteria and the second selected data criteria; and
provide an output choropleth map of the geographic boundary for display by the client, wherein the choropleth map comprises an indicia applied to each of the geographic units within the geographic boundary according to the normalized score.

22. The computer system of claim 21, wherein the instructions, when executed by the processor, further cause the computer system to:
receive a weight factor for each of the first selected data criteria and the second selected data criteria; and
calculate the normalized score for the first selected data criteria and the second selected data criteria according to each respective weight factor.

23. The computer system of claim 14, wherein the selected data criteria comprises a first selected data criteria and wherein the instructions, when executed by the processor, further cause the computer system to:
receive a second selected data criteria;
receive a weight for each of the first selected data criteria and the second selected data criteria;
retrieve data satisfying the first selected data criteria and the second selected data criteria for the geographic boundary from a geospatial dataset;
calculate a score for the retrieved data based on the weight for each of the first selected data criteria and the second selected data criteria; and
display a ranked list for the retrieved data according to the calculated scores.

24. The computer system of claim 23, wherein the instructions, when executed by the processor, further cause the computer system to:
calculate a first score for each record of the retrieved data based on the weight for the first selected data criteria;
calculate a second score for each record of the retrieved data based on the weight for the second selected data criteria; and
sum the first score and the second score for each record of the retrieved data to calculate the score for the retrieved data.

25. The computer system of claim 14, wherein the instructions, when executed by the processor, further cause the computer system to:
display a graphical user interface (GUI) on the client, wherein the GUI comprises a map and a menu of user-defined geographic area definition options through which the user-defined geographic area are definable relative to the map, where the user-defined geographic area definition options comprise:
a first option to define the user-defined geographic area via free form drawing on the map, where the free form drawing defines the pathway for a pipeline; and
a second option to define the user-defined geographic area by applying a geometric shape to the map, wherein the geometric shape defines the pathway for a pipeline.

26. The computer system of claim 14, wherein the instructions, when executed by the processor, further cause the computer system to:
identify, based on the calculated data criteria, a new potential customer household for the pipeline.

* * * * *